(12) United States Patent
Arethens et al.

(10) Patent No.: US 9,151,620 B2
(45) Date of Patent: Oct. 6, 2015

(54) DEVICE FOR DETERMINING LOCATION INFORMATION AND INERTIAL PRIMARY REFERENCES FOR AN AIRCRAFT

(71) Applicant: THALES, Neuilly sur Seine (FR)

(72) Inventors: Jean-Pierre Arethens, Beaumont les Valence (FR); Dominique Bouard, Valence Cedex (FR)

(73) Assignee: Thales, Neuilly-sur-Seine (FR)

( * ) Notice: Subject to any disclaimer, the term of this patent is extended or adjusted under 35 U.S.C. 154(b) by 113 days.

(21) Appl. No.: 13/857,673

(22) Filed: Apr. 5, 2013

(65) Prior Publication Data

US 2015/0032300 A1    Jan. 29, 2015

(30) Foreign Application Priority Data

Apr. 6, 2012    (FR) ..................................... 12 01034

(51) Int. Cl.
| | |
|---|---|
| *G01S 19/45* | (2010.01) |
| *G01C 21/00* | (2006.01) |
| *G01S 19/47* | (2010.01) |
| *G06F 11/16* | (2006.01) |
| *G06F 11/18* | (2006.01) |
| *G01C 21/10* | (2006.01) |
| *G01C 21/20* | (2006.01) |

(Continued)

(52) U.S. Cl.
CPC .............. *G01C 21/005* (2013.01); *G01C 21/10* (2013.01); *G01C 21/20* (2013.01); *G01C 23/005* (2013.01); *G01S 19/45* (2013.01); *G01S 19/47* (2013.01); *G06F 11/1645* (2013.01); *G06F 11/185* (2013.01); *G06F 11/1487* (2013.01)

(58) Field of Classification Search
CPC ..... G01S 19/45; G01S 19/47; G06F 11/1487; G06F 11/1608; G06F 11/1629; G06F 11/1633; G06F 11/1645; G06F 11/181; G06F 11/182; G06F 11/185; G01C 21/005; G01C 21/10; G01C 21/20
USPC .............................. 701/17; 342/357.3, 357.53
See application file for complete search history.

(56) References Cited

U.S. PATENT DOCUMENTS

| | | | |
|---|---|---|---|
| 6,205,376 B1 | 3/2001 | Gordon | |
| 7,715,955 B2 | 5/2010 | Tatham et al. | |

(Continued)

OTHER PUBLICATIONS

Butler, A Primer on Architectural Level Fault Tolerance, Feb. 2008, NASA Langley Research Center.*

*Primary Examiner* — John Q Nguyen
*Assistant Examiner* — Nadeem Odeh
(74) *Attorney, Agent, or Firm* — Michael J. Donohue; Davis Wright Tremaine LLP

(57) ABSTRACT

Device for determining location information, primary references consolidated for an aircraft, comprising a chain for determining location information comprising means for measuring radionavigation data, suitable means for consolidating, suitable means for computing parameters and suitable means for consolidating the parameters. The device also comprises a chain for determining inertial primary references comprising means for measuring inertial data, suitable means for consolidating, suitable means for computing parameters and suitable means for consolidating the parameters. The device finally comprises a chain for determining anemo-barometric data comprising means for measuring anemo-barometric data, suitable means for consolidating the measured anemo-barometric data, suitable means for computing parameters, and suitable means for consolidating the reference parameters.

11 Claims, 16 Drawing Sheets

(51) Int. Cl.
*G01C 23/00* (2006.01)
*G06F 11/14* (2006.01)

(56) References Cited

U.S. PATENT DOCUMENTS

| 7,911,380 | B2* | 3/2011 | Petillon | 342/357.3 |
| 2003/0130791 | A1 | 7/2003 | McIntyre | |
| 2007/0150122 | A1* | 6/2007 | Hongerholt et al. | 701/3 |
| 2008/0147255 | A1 | 6/2008 | Alwin et al. | |
| 2008/0319591 | A1 | 12/2008 | Markiton et al. | |
| 2010/0026567 | A1* | 2/2010 | Coatantiec et al. | 342/357.04 |
| 2011/0071710 | A1 | 3/2011 | Puig et al. | |
| 2011/0084874 | A1* | 4/2011 | Coatantiec | 342/357.3 |
| 2011/0181863 | A1 | 7/2011 | Renard et al. | |
| 2012/0004846 | A1 | 1/2012 | Coatantiec et al. | |

* cited by examiner

DEVICE FOR DETERMINING LOCATION INFORMATION AND INERTIAL PRIMARY REFERENCES FOR AN AIRCRAFT

TECHNICAL FIELD

The invention relates to a device for determining location information and inertial primary references for an aircraft.

To guarantee the high level of availability of an integral of the location information and inertial primary references and anemo-barometric data (or air data), necessary to the piloting and monitoring of a commercial aircraft in all the flight phases, the existing aircraft having a plurality of measurement means, applying different principles and technologies.

BACKGROUND ART

Checks on the consistency of the information supplied by the different measurement means are necessary to monitor the integrity of the data.

These checks are performed by the user systems (for example the flight management system) according to their various needs in terms of integrity.

The user systems are systems which use, among other things, inertial data or air data. Among the most critical user systems, there are the display system (manual piloting and monitoring of the automatic piloting), automatic pilot (PA) and flight controls (flight control system). There are also the alarm management system (known as flight warning system), the management of the engines, the braking management system, the surveillance system (weather radar, ground collision prevention, airplane collision prevention), the flight recorders and other systems even more functionally distant (such as the air conditioning, the passenger cabin video system, etc.).

This implies that certain systems use information that is deemed unusable by other systems. Consequently, this can lead to situations prejudicial to the safety of the flights, in cases of malfunction, detected or not, of one or more measurement means.

SUMMARY OF THE INVENTION

The invention aims to mitigate the problems cited above by proposing a device making it possible to supply coherent consolidated location parameters and unique primary references, having a high level of availability and of integrity, that can be used by all the systems of an aircraft.

To this end, the subject of the invention is a device (100) for determining location information, inertial primary references and anemo-barometric data consolidated for an aircraft, characterized in that it comprises:
 a circuit (110) for determining location information comprising:
 radionavigation measurement sensors (111) for measuring radionavigation data,
 radionavigation data consolidation means (112) for consolidating the measured radionavigation data,
 position parameter computing means (113) for computing aircraft position parameters from the consolidated radionavigation data,
 position parameter consolidation means (114) for consolidating the computed position parameters,
 a circuit (120) for determining inertial primary references comprising:
 inertial measurement sensors (121) for measuring inertial data indicating the movement of the aircraft relative to a terrestrial coordinate system,
 inertial data consolidation means (122) for consolidating the measured inertial data,
 inertial reference computing means (123) for computing inertial reference parameters of the aircraft from the consolidated inertial data,
 inertial reference data consolidation means (124) for consolidating the computed inertial reference parameters,
 a circuit (130) for determining anemo-barometric data comprising:
 air data measurement sensors (131) for measuring anemo-barometric data indicating movement of the aircraft relative to the air,
 air data consolidation means (132) for consolidating the measured anemo-barometric data,
 air data reference computing means (133) for computing anemo-barometric reference parameters of the aircraft from the consolidated anemo-barometric data,
 air data parameter consolidation means (134) for consolidating the computed anemo-barometric reference parameters.

In addition, the suitable means (112, 122, 132) for consolidating the data comprise a plurality of consolidation chains (201, 202, 203, 204), each of the consolidation chains (201) being associated with an index and comprising:
 a computation means (Q1), linked to all of said measurement means of the determination chain to which the suitable means for consolidating the data belong, said computation means comparing the measurements of said measurement means and making it possible to detect malfunctioning measurement means,
 an ordered storage means for storing the results of the computation of the computation means (Q2, Q3, Q4) of the other consolidation chains (202, 203, 204), ranking the results in ascending order of the indices associated with the consolidation chains (from i+1 to n, and from 1 to i−1) and eliminating the results of the computations of the consolidation chains for which the measurement means are malfunctioning,
 a first comparison means (C1), performing a comparison between the result of a computation means (Q1) and the first result of the ordered storage means storing the computation results of the other computation means (Q2, Q3, Q4) and making it possible to detect malfunctioning computation means,
 an ordered storage means for storing the results of the comparators (C2, C3, C4) ordering the results of the comparators in descending order of the indices associated with the consolidation chains (from i−1 to 1, and from n to i+1) and eliminating the results of the first comparisons of the consolidation chains for which the computation means are malfunctioning,
 a second comparison means (S1), making it possible to compare the result of a first comparison means (C1) with the result of one of the other first comparison means (C2, C3, C4), making it possible to detect malfunctioning first comparison means and making it possible to shutdown the consolidation chains for which the first comparison means are malfunctioning.

The invention has the advantage of supplying consolidated location parameters and unique inertial primary references, that can be used by all the systems of an aircraft.

The suitable means (122) for consolidating the data (112, 122, 132) and the suitable means for consolidating the reference parameters (114, 124, 134) make it possible to guarantee a high level of integrity of the data compatible with the different embedded systems using these data.

Advantageously, the device also comprises suitable means for hybridizing (140) the inertial data and the radionavigation signals.

Advantageously, the device also comprises suitable means for hybridizing (150) the inertial data and the anemo-barometric data.

Advantageously, the means (111) for measuring radionavigation data comprise two first sub-means (MCR1, MCR2) and two different second sub-means (GBAS_GPS_1, GBAS_GPS_2) each linked to two antennas (AGN1, AGN2) supplying synchronous measurements on the radionavigation signals (GNSS_Rd1, GNSS_Rd2, GPS_Rd1, GPS_Rd2) and navigation messages, the suitable means (112) for consolidating the measured radionavigation data comprise four third sub-means (consolidate_GNSS_1, consolidate_GNSS_2, consolidate_GNSS_3, consolidate_GNSS_4) making it possible to consolidate the measurements on the radionavigation signals (GNSS_Rd1, GNSS_Rd2, GPS_Rd1, GPS_RD2), and the suitable means (113) for computing aircraft position parameters and the suitable means (114) for consolidating the computed position parameters comprise two fourth sub-means (fusion_POS3D1, fusion_POS3D2) making it possible to compute positions of the aircraft from consolidated inertial data measurements (C_INS1, C_INS2) and consolidated radionavigation signal measurements (C_GNSS1, C_GNSS2). In addition, the device also comprises two fifth sub-means (PAN_SW1, PAN_SW2) making it possible to activate, for a given approach, an approach means selected by the pilot, and making it possible to compute deviations relative to a predetermined reference approach trajectory; and two sixth sub-means (PAN_SW1_mon, PAN_SW2_mon) making it possible to consolidate the computations of the deviations.

Advantageously, the means (111) for measuring radionavigation data comprise three seventh sub-means (MCR1, MCR2, MCR3) each linked to three antennas (AGN1, AGN2, AGN3) supplying synchronous measurements on radionavigation signals GNSS_Rd1, GNSS_Rd2, GNSS_RD3) and navigation messages, the suitable means (112) for consolidating the measured radionavigation data comprise three eighth sub-means (consolidate_GNSS_1, consolidate_GNSS_2, consolidate_GNSS_3) for consolidating the measurements on the radionavigation signals (GNSS_Rd1, GNSS_Rd2, GNSS_RD3) and the suitable means (113) for computing aircraft position parameters and the suitable means (114) for consolidating the computed position parameters comprise three ninth sub-means (fusion_POS3D1, fusion_POS3D2, fusion_POS3D3) for computing positions of the aircraft from consolidated inertial data measurements (C_INS1, C_INS2, C_INS3) and consolidated radionavigation signal measurements (C_GNSS1, C_GNSS2, C_GNSS3). Furthermore, the device also comprises three tenth sub-means (manage GLS_SW1, Manage_GLS_SW2 and Manage_GLS_SW3) for activating, for a given approach, an approach means selected by the pilot, for computing and consolidating deviations relative to a predetermined reference approach trajectory.

Advantageously, a radionavigation equipment item (RAD-NAV) making it possible to transmit/receive radio waves observing all the standards used in the radionavigation applications.

Advantageously, the device comprises two means for detecting movements and accelerations, a dual satellite location receiver, and means for determining the location from the signals received from said dual receiver.

Advantageously, the device comprises three means for detecting movements and accelerations, a dual satellite location receiver, and means for determining the location from the signals received from said dual receiver.

Advantageously, the device comprises at least one first receiver comprising an antenna and analogue and digital processing means for processing the signals originating from the antenna.

Advantageously, the first receiver is chosen from:
a second location signal receiver using the VOR/DL standard comprising a sub-means for receiving a signal in the VHF frequency band, a sub-means for sampling said signal received in the VHF frequency band and a sub-module for determining a distance between a VOR transmission/reception beacon and said signal receiver from said sampled signal;
a third receiver of satellite location signals comprising sub-means (MCR1, MCR2, MCR3) each linked to three antennas (AGN1, AGN2, AGN3) supplying synchronous measurements on radionavigation signals (GNSS_Rd1, GNSS_Rd2, GNSS_RD3) and navigation messages,
a fourth receiver of distance signals using the DME standard comprising a sub-device supplying distances according to the DME standard;
a first landing assistant device using the ILS standard comprising a digital processing chain for processing the signals received in the VHF and UHF bands and supplying location deviations;
a second landing assistant device using the ILS standard comprising a digital processing chain for processing the signals received in the VHF and UHF bands and supplying deviations relative to the landing gradient.

Advantageously, the means for measuring inertial data comprise at least two eleventh sub-means (UMI-A1, UMI-A2) and at least two twelfth different sub-means (UMI-C1, UMI-C2) supplying raw inertial measurements of accelerations and of angular speeds (INS-X RD, Raw Data). Furthermore, the suitable means for consolidating the measured inertial data comprise at least three thirteenth sub-means (Consol-IRS1, Consol-IRS2, Consol-IRS3) for consolidating said raw inertial measurements of accelerations and of angular speeds. The suitable means for computing inertial reference parameters comprise at least two fourteenth sub-means (PFV-A1, PFV-A2) processing said data measured by the at least two eleventh sub-means and at least two fifteenth sub-means (PFV-C1, PFV-C2) processing said data measured by the at least two twelfth different sub-means (UMI-C1, UMI-C2). Finally, the suitable means for consolidating the computed inertial reference parameters comprise at least three sixteenth sub-means (Consol PFV1, Consol PFV2, Consol PFV3) for consolidating said data originating from the at least two fourteenth sub-means (PFV-A1, PFV-A2) and from the at least two fifteenth sub-means (PFV-C1, PFV-C2).

Advantageously, the means for measuring anemo-barometric data comprise sub-means for measuring the total pressure (Pt) and/or sub-means for measuring the static pressure (Ps) and/or sub-means for measuring the air angle of attack (AOA) and/or sub-means for measuring the air side slip angle (SSA) and/or sub-means for measuring the airspeed. Furthermore the suitable means for consolidating the measured anemo-barometric data comprise seventeenth sub-means for computing anemo-barometric parameters (ADC). Also, the suitable means for computing anemo-barometric reference parameters of the aircraft from the consolidated anemo-barometric data comprise eighteenth sub-means for computing the anemo-barometric parameters (ADC). Finally, the suitable means for consolidating the computed anemo-barometric reference parameters comprise three nineteenth sub-means (ConsolAD) consolidating the data obtained from said eighteenth and nineteenth sub-means (ADC) and are also suitable for using data originating from other systems (Aiding systems).

BRIEF DESCRIPTION OF THE
ACCOMPANYING DRAWINGS

The invention will be better understood and other advantages will become apparent on reading the detailed description, given as a nonlimiting example, and with the aid of the figures in which:

FIG. 1 presents a functional diagram of the device for determining location information according to the invention.

DESCRIPTION OF PREFERRED
EMBODIMENTS

Figure 1:
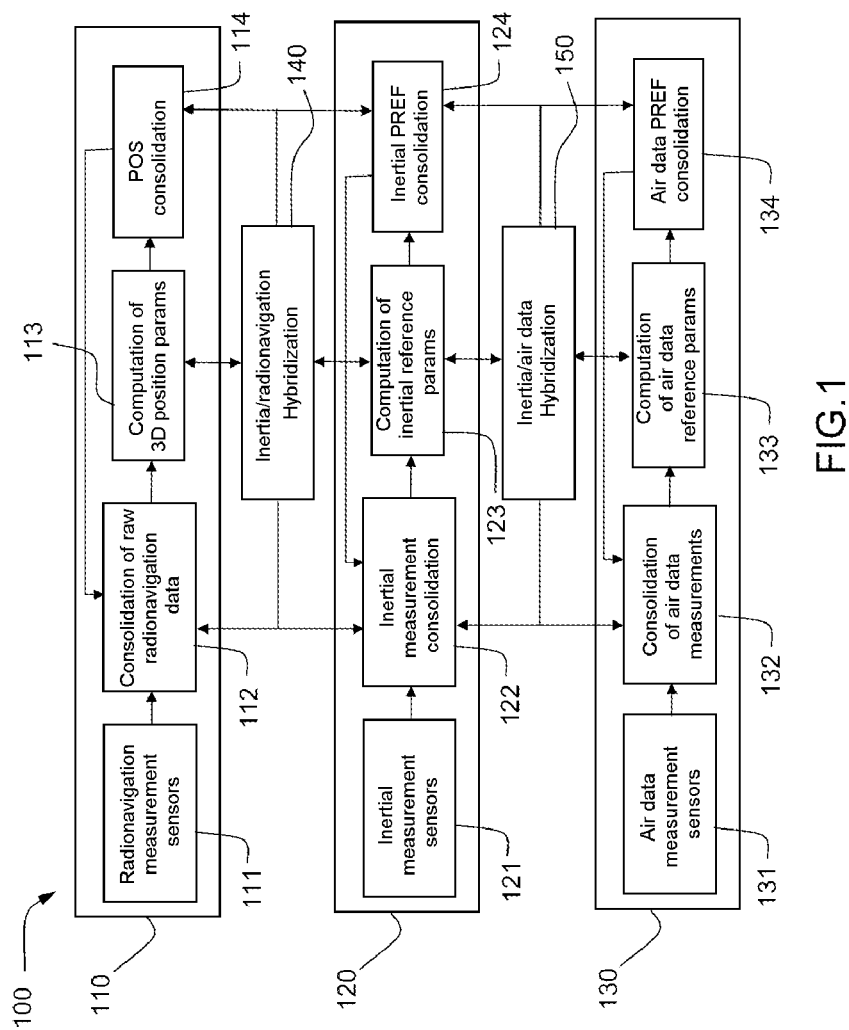

FIG. 1 presents a functional diagram of the device for determining location information according to the invention. The device makes it possible to determine location information, inertial primary references and anemo-barometric data consolidated for an aircraft. This device comprises:
   a chain 110 for determining location information comprising:
      means 111 for measuring radionavigation data,
      suitable means 112 for consolidating the measured radionavigation data,
      suitable means 113 for computing aircraft position parameters,
      suitable means 114 for consolidating the computed position parameters,
   a chain 120 for determining inertial primary references comprising:
      means 121 for measuring inertial data indicating the movement of the aircraft relative to a terrestrial coordinate system,
      suitable means 122 for consolidating the measured inertial data,
      suitable means 123 for computing inertial reference parameters of the aircraft,
      suitable means 124 for consolidating the computed inertial reference parameters,
   a chain 130 for determining anemo-barometric data comprising:
      means 131 for measuring anemo-barometric data indicating movement of the aircraft relative to the air,
      suitable means 132 for consolidating the measured anemo-barometric data,
      suitable means 133 for computing anemo-barometric reference parameters of the aircraft,
      suitable means 134 for consolidating the computed anemo-barometric reference parameters.

The principles used for the upstream consolidation of the measurements obtained from the different sensors apply a set of statistical tests derived from the comparison between expected measurements and actual measurements. The measurements from the different sensors of a particular type are generally not mutually synchronous, and are not physically co-located.

The installation and synchronization "defect" measurements are corrected to bring them hypothetically to the same point, and to the same instant. In particular, it is considered that the measurements supplied by sensors of a particular type are made at instants that are sufficiently close together for there to be no need to extrapolate the signals to be able to compare them, or that they are date-stamped by a common clock signal which makes it possible to resynchronize the data items relative to one another.

To perform the tests, it is considered that, in the short term, the measurements are only affected by measurement noise dependent on the performance levels of the measurement sensors, and efforts are made to detect a defect of abnormal bias type on these measurements. For a system with "n" sensors, an abnormal behaviour of a sensor will therefore be detected by verifying that the deviations between the measurements of each sensor from the weighted average of the (n−1) different sensors is compatible with the statistical characteristics of the short-term noise expected on the measurement.

This comparison may use a set of filtered values with filtering times compatible with authorized failure detection warning times. As soon as just one of the values deviates significantly from the others, the presence of an anomaly is detected and the measurement from the sensor concerned is rejected. The statistical test values for deciding to reject are fixed to guarantee the operational continuity of the system. They can be continually adapted to take account of external conditions such as the dynamics.

The aim of the downstream consolidation is to verify that the upstream consolidation and the various processing operations performed after the upstream consolidation are not errored as a result of an undetected failure of the computers which carry out these operations. Values obtained from similar computations performed in parallel are therefore compared. The comparison tests take into account the computation noises associated with the possible asynchromisms between the different chains.

The type and the number of means implemented for the measurements and their consolidation evolve from the synthesis of the performance needs of the user systems defined as requirements:
- of integrity: risk associated with the use of errored data following an undetected malfunction,
- of continuity: risk associated with the loss of data following a detected malfunction, and
- of operational availability: probability that the system is fully operational.

These requirements are represented by probabilities of occurrence over a given exposure time. They are ranked according to the potential gravity associated with the occurrence of this event. An event for which the risk may be the loss of the aircraft and of its passengers has to have a probability less than $10^{-9}$/h, an event for which the risk may be significant damage to the aircraft has to have a probability less than $10^{-7}$/h. An event for which the risk may be the reduction of the performance levels and of the operational capabilities of the aeroplane has to have a probability less than $10^{-5}$/h.

As a general rule, it is estimated that the measurement sensors have a failure rate of $10^{-4}$/h and are equipped with failure monitoring capability having a detection rate of 90%. Also, the consolidation algorithms are implemented on computers with an assumed failure rate of $10^{-5}$/h equipped with failure monitoring capability having a detection rate of 95%.

In order to hold to the performance objectives which are several orders of magnitude more restrictive than those that can be provided by a chain consisting of a sensor and an associated signal processing element, it is necessary to introduce parallel redundant architectures whose results are continually compared to provide information with the desired integrity and continuity performance levels.

Figure 2:
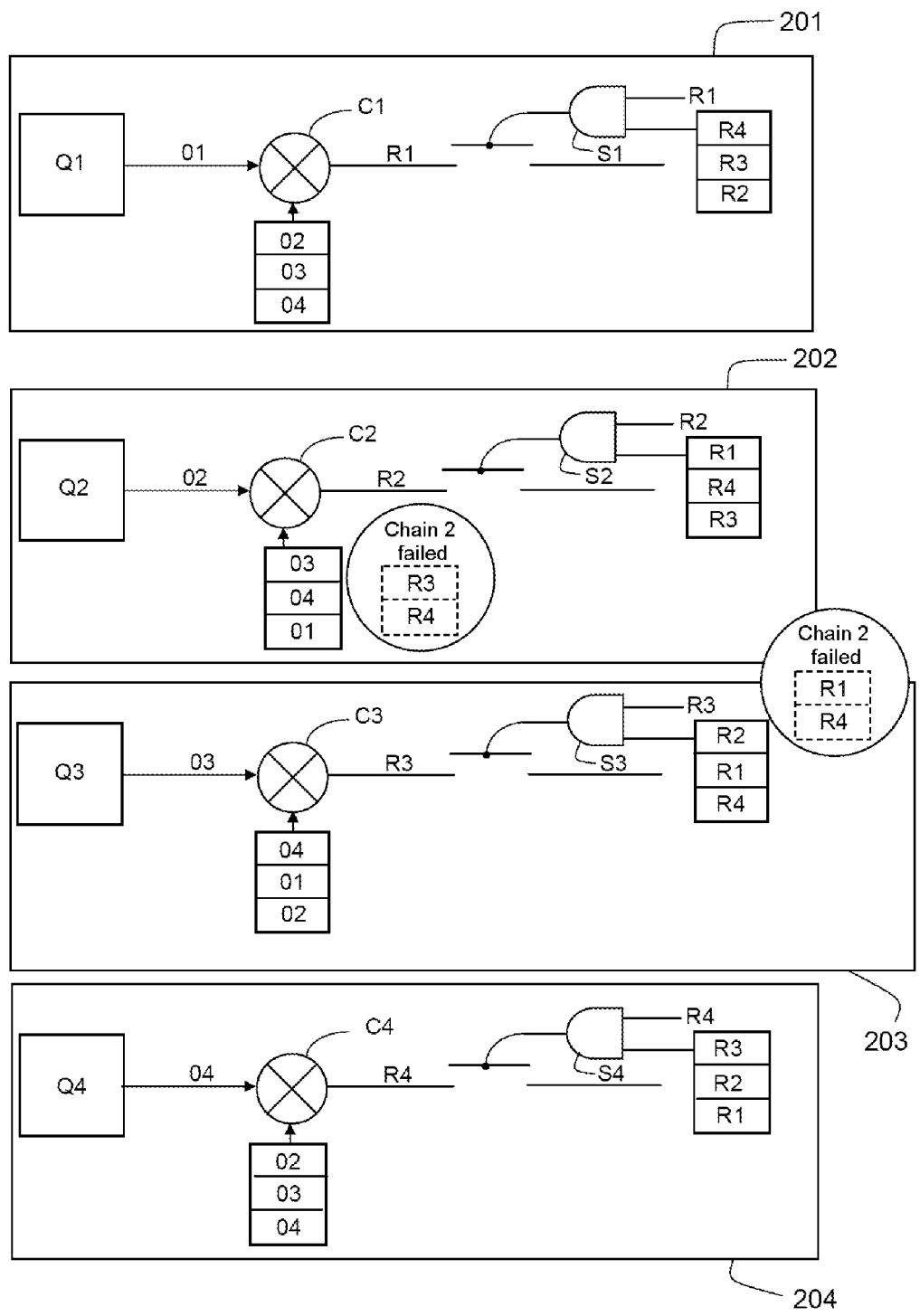
FIG. 2 represents four consolidating chains each linked to a plurality of sensors.

FIG. 2 represents four consolidation chains each linked to a plurality of sensors and belonging to one and the same determination chain (for example the chain for determining inertial primary references). This configuration illustrates the redundant type of architecture described previously. This architecture implements a plurality of measurement sensors and consolidation computers interconnected by buses allowing for high-speed information interchanges.

FIG. 2 represents four consolidation chains 201, 202, 203, 204, each of the consolidation chains being associated with an index and comprising:
- a computation means (Q1), linked to all of the sensors of the determination chain to which the suitable means for consolidating the data belong, said computation means comparing the measurements of the sensors and making it possible to identify malfunctioning sensors,
- an ordered storage means for storing the computation results of the computation means (Q2, Q3, Q4) of the other consolidation chains (202, 203, 204), ranking the results in ascending order of the indices associated with the consolidation chains (from i+1 to n, and from 1 to i−1) and eliminating the results of the consolidation chains detected to have failed,
- a first comparator (C1), performing a comparison between the result of the computation means (Q1) and the first result from the ordered storage means storing the computation results of the computation means (Q2, Q3, Q4),
- an ordered storage means storing the results of the comparators (C2, C3, C4) ordering the results of the comparators in descending order of the indices associated with the consolidation chains (from i−1 to 1, and from n to i+1) and eliminating the results of the comparators for which consolidation chains are detected to have failed,
- a second comparator (S1), making it possible to compare the result of the first comparator (C1) with the result of the first comparators (C2, C3, C4), so as to cut the output to the storage means $Q_i$ and $Q_{i+1}$ (Q1 if i=n).

In this way, an undetected failure in a computation element Qi will cause the outputs $Q_i$ and $Q_{i+1}$ (Q1 if i=n) to be cut.

The purpose of the elements for storing the results from the outputs of the consolidation chains and the comparator commands is to be able to reconfigure the comparison structure as a ring in the event of the loss of one or more consolidation chains.

The measurements delivered by the plurality of sensors are compared by the consolidation algorithms implemented on four computation elements. These consolidation algorithms make it possible to identify one or more malfunction sensors. The redundancy of implementation of the consolidation algorithms makes it possible to guarantee the integrity and the continuity of the consolidation process by comparator mechanisms of the different outputs, crossed in pairs, controlling physical switches with which to isolate the defective outputs.

The minimum number of sensors and of consolidation computers that must be implemented depends on the desired integrity and continuity performance level. The table below indicates the minimum number of sensors and of consolidation computers that must be implemented in order to hold a variety of integrity and continuity performance levels.

| Integrity requirement | Continuity requirement | Number of sensors | Number of computers performing the consolidation |
|---|---|---|---|
| Catastrophic | Catastrophic | 4 | 3 |
| Catastrophic | Hazardous | 4 | 3 |
| Hazardous | Catastrophic | 3 | 3 |
| Hazardous | Hazardous | 3 | 3 |
| Hazardous | Major | 3 | 2 |
| Major | Hazardous | 2 | 3 |
| Major | Major | 2 | 2 |

The radionavigation sensors supply a position of the aeroplane in a terrestrial coordinate system through computations using triangulation, using measurements of distance or of bearings relative to objects of known position. Five different types of systems are considered, the use of which depends on the flight phases of the aeroplane. The table below provides the list of systems supporting the different operations.

| Flight phase | System to be used |
|---|---|
| Oceanic navigation | GNSS |
| Domestic navigation | GNSS/VOR/DME |
| Navigation in approach | GNSS-SBAS/ILS |
| Landing/take-off | GNSS-GBAS/ILS/MLS |
| Taxiing | GNSS-SBAS or GBAS |

For the implementation of the invention, it is assumed that the primary navigation means handling the locating of the aeroplane in all its flight phases is satellite radionavigation with its augmentations. Domestic navigation (navigation in proximity to an airport) based on conventional positioning means such as the system known by the acronym VOR (VHF Omnidirectional Range) or the system known by the acronym DME (Distance Measuring Equipment), or navigation in approach using the standard known as MLS (Microwave Landing System) or the standard known by the name ILS (Instrument Landing System) are considered to be secondary navigation means. In this regard, the present invention therefore describes the consolidation aspects with respect to the satellite location known as GNSS and does not detail the consolidation with respect to the secondary means. However, principles similar to those described for GNSS can be applied to these means.

The GNSS radionavigation sensors supply distance measurements relative to satellites of known position. These distance measurements can be enhanced when augmentation systems provide corrections for correcting the GNSS measurement errors that can be observed by these systems. From these measurements, 3D position/speed and time information is deduced, in a known terrestrial coordinate system. The more accurate the position obtained, the more it can support the operations that unfold in proximity to the ground. With the most powerful GBAS (Ground Based Augmentation System) augmentation system, the position obtained can make it possible to compute aeroplane guidance information that can be used up to its landing. The risk associated with the supply of errored information that goes undetected can in this case have catastrophic consequences, the probability of which must not exceed $10^{-9}$/landing, and the loss of information close to the ground may result in hazardous situations, the probability of which must not exceed $10^{-7}$/landing.

This constraint makes it necessary to consider a minimum of three GNSS sensors supplying satellite distance measurements to which GBAS corrections will be applied. This constraint may seem overabundant to satisfy the requirements corresponding to the other navigation phases for which just two receivers would make it possible to guarantee the integrity and continuity performance levels. However, the consequence associated with the supply of errored information that goes undetected is less serious for these phases, and the probability accepted for this risk is higher. However, the fact of having three sensors makes it possible to guarantee the aspects of operational availability of the primary navigation means in the event of failure of a sensor before take-off.

The GNSS measurement sensors must have performance levels compatible with use in SBAS (Satellite Based Augmentation System) and GBAS augmented mode, conforming to the GNSS interoperability standards specifying the requirements of these modes.

It should also be considered that, in GBAS mode, the corrections have to be supplied by a data reception function or VHF data link. The constraint on reception stems only from the needs of continuity in the supply of correction information, the data transmission protocol making it possible to guarantee the integrity thereof through redundancy check mechanisms. While three GNSS reception chains are required to supply a GBAS position meeting a landing need, only two VDB reception chains are needed to meet the need of continuity and of allocation of the aeroplanes to the runways (dispatch).

With respect to the VOR/DME radionavigation sensors which constitute a secondary navigation means, taking into account the different performance constraints means retaining configurations comprising two VOR sensors and two DME sensors.

With respect to radionavigation sensors using the standard known by the acronym ILS (Instrument Landing System) and by the acronym MLS (Microwave Landing System) making it possible to perform precision approaches and landings, the different performance constraints mean retaining configurations comprising three ILS/MLS sensors or two dual sensors with regard to the digital signal-processing part. Given the high reliability of the RF elements considered for producing an ILS (LOC or GLIDE) or MLS reception chain, it is considered that, in dual architectures, one RF sensor can be shared by two chains supplying deviations.

Finally, it should be noted that the VOR/VDB/ILS LOC signals are broadcast in the same frequency band and they can be received by common reception means because the use of these signals is generally exclusive.

The table below summarizes the different radionavigation measurement sensors needed to supply consolidated location information.

| Measurement sensors | Min number | Note |
|---|---|---|
| VOR | 2 | Signals in VHF band |
| DME | 2 | Signals in UHF band |
| VDB | 2 | Signals in VHF band |
| LOC ILS | 2 | Signals in VHF band |
| GLIDE ILS | 2 | Signals in UHF band |
| MLS | 3 | Signals in SHF band |
| GNSS | 3 | Signals in UHF band |

The inertial sensors supply measurements of the movement of the aeroplane in six dimensions (three linear and three angular) relative to a terrestrial coordinate system. These measurements are performed by groups (or clusters) of three accelerometers and three gyrometers grouped together in inertial measurement units (or UMI) which supply rotation and acceleration speed measurements according to three axes of right angles in space, linked to the structure of these UMIs. The different performance constraints linked to the supply of such information are as follows:

The supply of non-integrated consolidated inertial information and the inability to check the integrity of the information supplied are considered to be catastrophic events that may lead to loss of the aeroplane. They must therefore have a probability less than $10^{-9}$/hour of flight. This constraint makes it necessary to consider a minimum of four different sensor blocks.

The risk associated with the undetected erroneous supply of inertial primary reference information is catastrophic so the common malfunction mode of the sensor blocks must be excluded. It is therefore necessary to consider sensor blocks of different technologies.

To operate the aeroplane in these superior piloting modes with a high level of availability, it is necessary to consider a certain number of sensor blocks equipped with accelerometric gyrometric sensors of high sensitivity. A minimum of two devices will be considered, making it possible to detect movements and accelerations known as so-called class A UMI (comprising gyrolaser sensors with angular speed measurement sensitivity less than 1/100 deg/hour, and pendulum accelerometer sensors with 10 µg class sensitivity). The remaining dissimilar UMIs may be so-called class C UMIs sufficient to monitor the aeroplane in degraded piloting modes (comprising gyrolaser sensors of so-called MEMS (Microelectromechanical Systems) type with angular speed measurement sensitivity less than 5° deg/hour, and MEMS accelerometric sensors with measurement sensitivity classed at a few mg).

The operational constraints require the ability to start a flight with one equipment item failed without that being prejudicial to the performance of the aeroplane. This means considering at least one additional sensor block. The additional UMI block will preferably be class A to optimize the operational aeroplane performance levels in the event of double failure on the class A UMIs, but this may also be a class C block.

The table below summarizes the different inertial sensors needed to supply consolidated inertial primary reference information.

| Measurement sensors | Minimal number | Note |
| --- | --- | --- |
| Class A | 2 or 3 | Response to the superior piloting mode requirement |
| Class C | 2 | Response to the integrity requirement (common failure mode) and degraded piloting mode |
| Class A or C | 1 | Response to the dispatch requirement |

The anemo-barometric sensors supply measurements of the movements of the aeroplane relative to the air. These measurements are performed by groups (or clusters) of sensors which supply measurements of angle of attack, of side slip angle, of speed relative to the air, of temperature and of altitude.

The different performance constraints linked to the supply of such information are as follows:

The supply of non-integrated consolidated conventional airspeed (Calibrated Airspeed, CAS) as well as the inability to check the integrity of the information supplied are considered to be catastrophic events that might lead to the loss of the aeroplane. They must therefore have a probability less than $10^{-9}$/hour of flight. This constraint means considering a minimum of four different measurement chains.

The supply of non-integrated consolidated angle of attack (AOA) information is considered to be a catastrophic event, the inability to check the integrity of the information supplied is considered to be a hazardous event. This constraint makes it necessary to consider a minimum of four different measurement chains.

The supply of non-integrated standard consolidated barometric altitude information (Zb) is considered to be a catastrophic event, the inability to check the integrity of the information supplied is considered to be a hazardous event. This constraint makes it necessary to consider a minimum of four different measurement chains.

The supply of non-integrated consolidated side slip angle (SSA) information is considered to be a hazardous event, the inability to check the integrity of the information supplied is considered to be a major event. This constraint makes it necessary to consider a minimum of two different measurement chains.

The risk associated with the undetected erroneous supply of consolidated CAS or AOA anemo-barometric information can have consequences deemed catastrophic, so the common malfunction mode of the air data measurement chains must be excluded. It is therefore necessary to consider measurement chains using different technologies. The response to the need for dissimilarity may lead to considering architectures based on pressure/temperature measurements where the dissimilarity is introduced by the type of probe used, or architectures using functional chains in which the physical measurement principles implemented differ: use of pressure measurement and laser anemometry, measurement of angles by mechanical weather vane, by ultrasound sensors, or by laser technology.

The table below summarizes the different functional chains needed to supply consolidated air data information.

| Measurement chains | Min number | Note |
| --- | --- | --- |
| Zb | 4 | |
| CAS | 4 | Uses the temperature measurements if laser anemo measurements |
| TAS | 3 | Uses the temperature measurements if pressure measurements. |
| AOA | 4 | |
| SSA | 2 | |
| SAT, TAT | 3 | |

In order to describe different architectures of the device according to the invention, there are defined, for each of the information determination chains (location, inertial references, anemo-barometric references), reference logic architectures and the main logic components, or associated sub-means or sub-devices.

As used herein, the term "chain" refers to a circuit comprising a sequence of components (e.g., hardware components, logic components, and the like) to process the various types of information (e.g., location information, inertial information, and anemo-barometric information). These logic components are, for example, a dedicated chip or an electronic circuit board comprising a generic processor, memory and dedicated chips. The logic components of these chains are as follows:

MCR: logic component supplying GNSS measurements and messages. In accordance with what was explained in the section of navigation sensors, it is necessary to have at least three MCR blocks in the architecture.

Consol GNSS RD: logic component for the upstream consolidation of the raw GNSS data. The aim of this logic block is to detect anomalies on the measurements and the GNSS messages due to the aeroplane reception environment (antenna failure, receiver, multiple paths on an antenna). It is necessary to have at least three Consol GNSS RD logic components in the architecture.

Consol POS3D: logic component for the downstream consolidation of the supply of 3D GNSS positions compatible with navigation and approach needs. These positions can be hybridized with inertial information. To compute a position compatible with the approach needs, the consolidated GNSS measurements are corrected by differential corrections supplied from the GNSS augmentation systems. The aim of this logic block is to detect anomalies on the position computations performed on the basis of the consolidated GNSS and inertial measurements, and possibly correction information supplied by the VDBs. It is necessary to have at least three Consol POS3D logic components in the architecture.

Consol GLS/FLS: component for the downstream consolidation of the supply of guidance deviations computed on the basis of an augmented GNSS position supplied by the consol POS3D block. The deviations are computed relative to an approach trajectory, the characteristics of which are supplied to the components. The aim of this logic block is to detect anomalies on the guidance deviation computations performed on the basis of the augmented GNSS positions. It is necessary to have at least three Consol GLS/FLS logic components in the architecture.

VHF: VHF reception logic component for supplying sampled VHF band signal measurements allowing for the digital signal processing of the VOR/VDB/ILS LOC signals. It is necessary to have at least two components in the architecture.

UHF: reception logic component for supplying sampled UHF band signal measurements allowing for the digital signal processing of the ILS GLIDE (and possibly DME) signals. It is necessary to have at least two components in the architecture.

VDB: logic component for processing sampled VDB signals supplying the data link messages for computing an enhanced differential GNSS position supporting the approach mode. Two VDB logic components are needed in the architecture.

VOR: logic components supplying VOR bearings on the basis of the processing of the VHF signals. Two VOR components are needed in the architecture.

DME: logic component supplying DME distances. Two DME components are needed in the architecture.

Two logic architecture variants of the device according to the invention are described hereinbelow.

Figure 3:
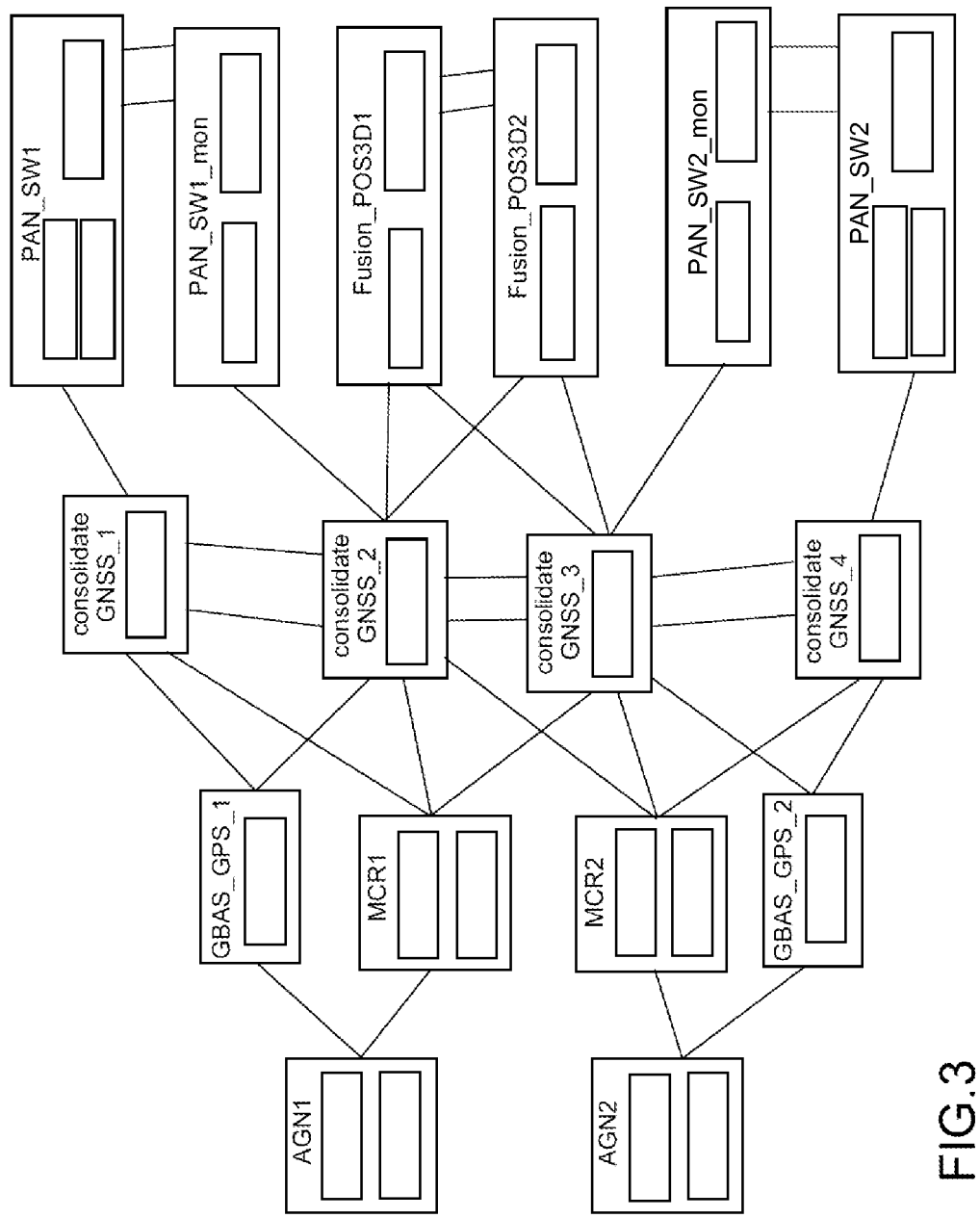
FIG. 3 represents a first variant of a logic architecture of the device according to the invention.

FIG. 3 represents a first variant of a logic architecture of the device according to the invention.

In the first logic architecture variant, the means 111 for measuring radionavigation data are implemented by two logic components (MCR1, MCR2) and two dissimilar logic components (GBAS_GPS_1, GBAS_GPS_2) each linked to two antennas (AGN1, AGN2) supplying synchronous measurements on the radionavigation signals (GNSS_Rd1, GNSS_Rd2, GPS_Rd1, GPS_Rd2) and navigation messages. The measurements supplied are synchronized on the GPS time.

The suitable means 112 for consolidating the measured radionavigation data are implemented by four logic components (consolidate_GNSS_1, consolidate_GNSS_2, consolidate_GNSS_3, consolidate_GNSS_4) for the consolidation of the measurements on the radionavigation signals (GNSS_Rd1, GNSS_Rd2, GPS_Rd1, GPS_RD2).

The suitable means 113 for computing aircraft position parameters and the suitable means 114 for consolidating the computed position parameters are implemented by two logic components (fusion_POS3D1, fusion_POS3D2) for computing positions of the aircraft on the basis of consolidated inertial data measurements (C_INS1, C_INS2) and consolidated radionavigation signal measurements (C_GNSS1, C_GNSS2).

The device also comprises:
two components (PAN_SW1, PAN_SW2) for activating, for a given approach, an approach means selected by the pilot, and computing deviations relative to a predetermined reference approach trajectory, and
two logic components (PAN_SW1_mon, PAN_SW2_mon) for consolidating the computations of the deviations.

The synchronous measurements on the radionavigation signals (GNSS_Rd1, GNSS_Rd2, GPS_Rd1, GPS_Rd2) are mutually consolidated in the logic components (consolidate_GNSS_1, consolidate_GNSS_2, consolidate_GNSS_3, consolidate_GNSS_4) for the consolidation of the measurements on the radionavigation signals. The consolidation can also use predictions of measurements performed by the logic components (fusion_POS3D1, fusion_POS3D2) for the computation of positions of the aircraft. The logic components (consolidate_GNSS_1, consolidate_GNSS_2, consolidate_GNSS_3, consolidate_GNSS_4) for the consolidation of the measurements on the radionavigation signals also perform computations of attitude of the antenna base consisting of the two antennas (AGN1, AGN2). The result of the consolidation is a set of GNSS consolidated measurements "C_GNSSi".

The logic components (fusion_POS3D1, fusion_POS3D2) for computing positions of the aircraft use consolidated inertial measurements "C_INSi" and GNSS consolidated measurements "C_GNSSi".

GPS inertia hybridization computations are also performed in these blocks so as to produce predictions on the inertial parameters "IR_expi" and the measurements "GNSS GN_Expi". These predictions are used in the upstream consolidation blocks to improve the monitoring of the measurements performed by the inertial or GNSS sensors. Also, the blocks exchange control data "PCTLij" which make it possible to check the mutual consistency of the integrity of the computations performed and order the shutdown of the transmission of the computed data by the block should an inconsistency be detected.

Figure 4:
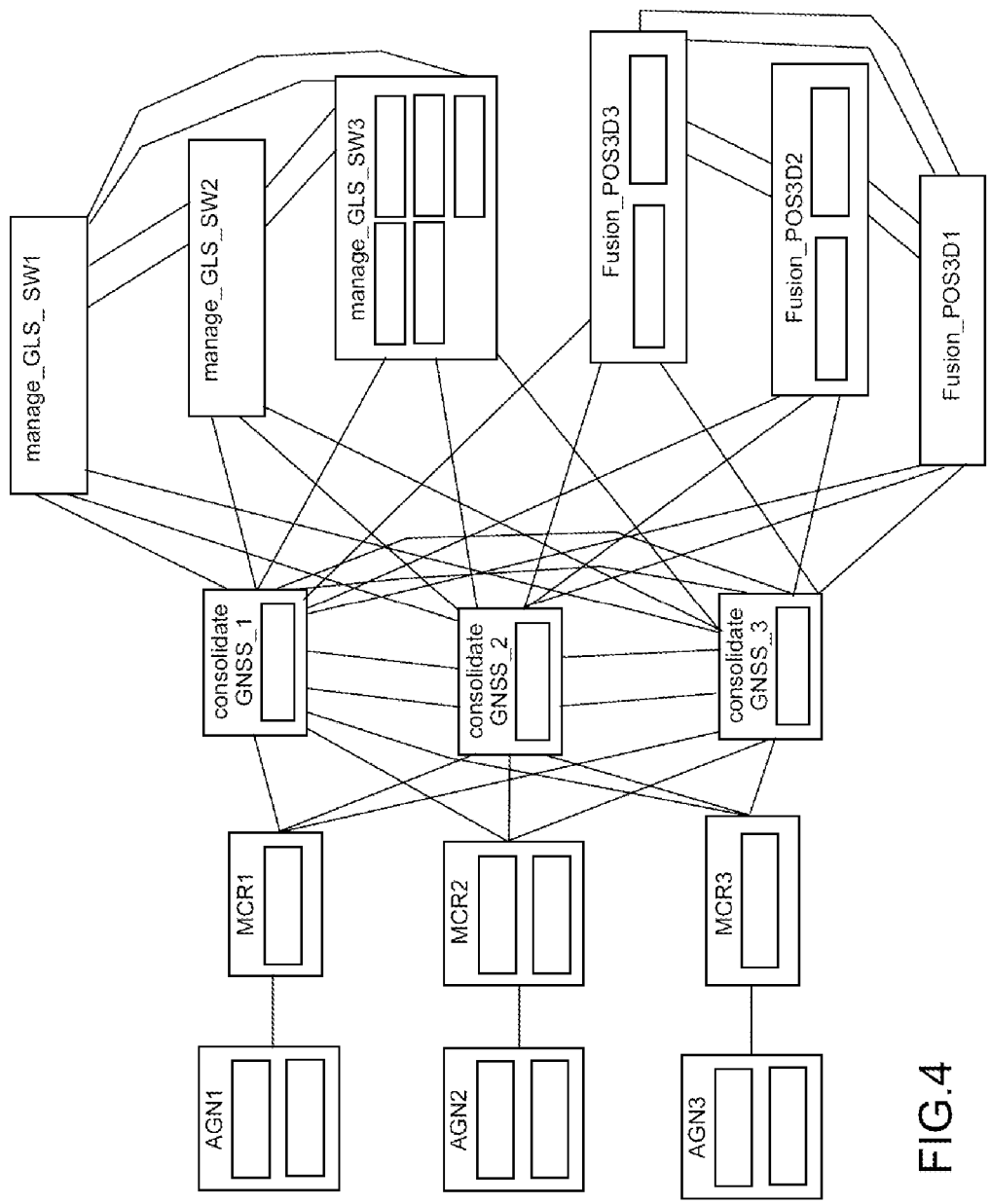
FIG. 4 represents a second variant of a logic architecture of the device according to the invention.

FIG. 4 represents a second logic architecture variant of the device according to the invention.

In the second logic architecture variant, the means 111 for measuring radionavigation data comprise three logic components (MCR1, MCR2, MCR3) each linked to three antennas (AGN1, AGN2, AGN3) supplying synchronous measurements on radionavigation signals (GNSS_Rd1, GNSS_Rd2, GNSS_RD3) and navigation messages.

The suitable means 112 for consolidating the measured radionavigation data comprise three logic components (consolidate_GNSS_1, consolidate_GNSS_2, consolidate_GNSS_3) for the consolidation of the measurements on the radionavigation signals (GNSS_Rd1, GNSS_Rd2, GNSS_RD3).

The suitable means (113) for computing aircraft position parameters and the suitable means (114) for consolidating the computed position parameters are implemented by two logic components (fusion_POS3D1, fusion_POS3D2, fusion_POS3D3) for the computation of positions of the aircraft on the basis of consolidated inertial data measurements (C_INS1, C_INS2, C_INS3) and consolidated radionavigation signal measurements (C_GNSS1, C_GNSS2, C_GNSS3).

The device for determining location information also comprises: three components (manage GLS_SW1, Manage_GLS_SW2 and Manage_GLS_SW3) for activating, for a given approach, an approach means selected by the pilot, for computing and consolidating deviations relative to a predetermined reference approach trajectory.

Both architectures make it possible to obtain an equivalent performance level in terms of integrity and continuity.

Figure 5:
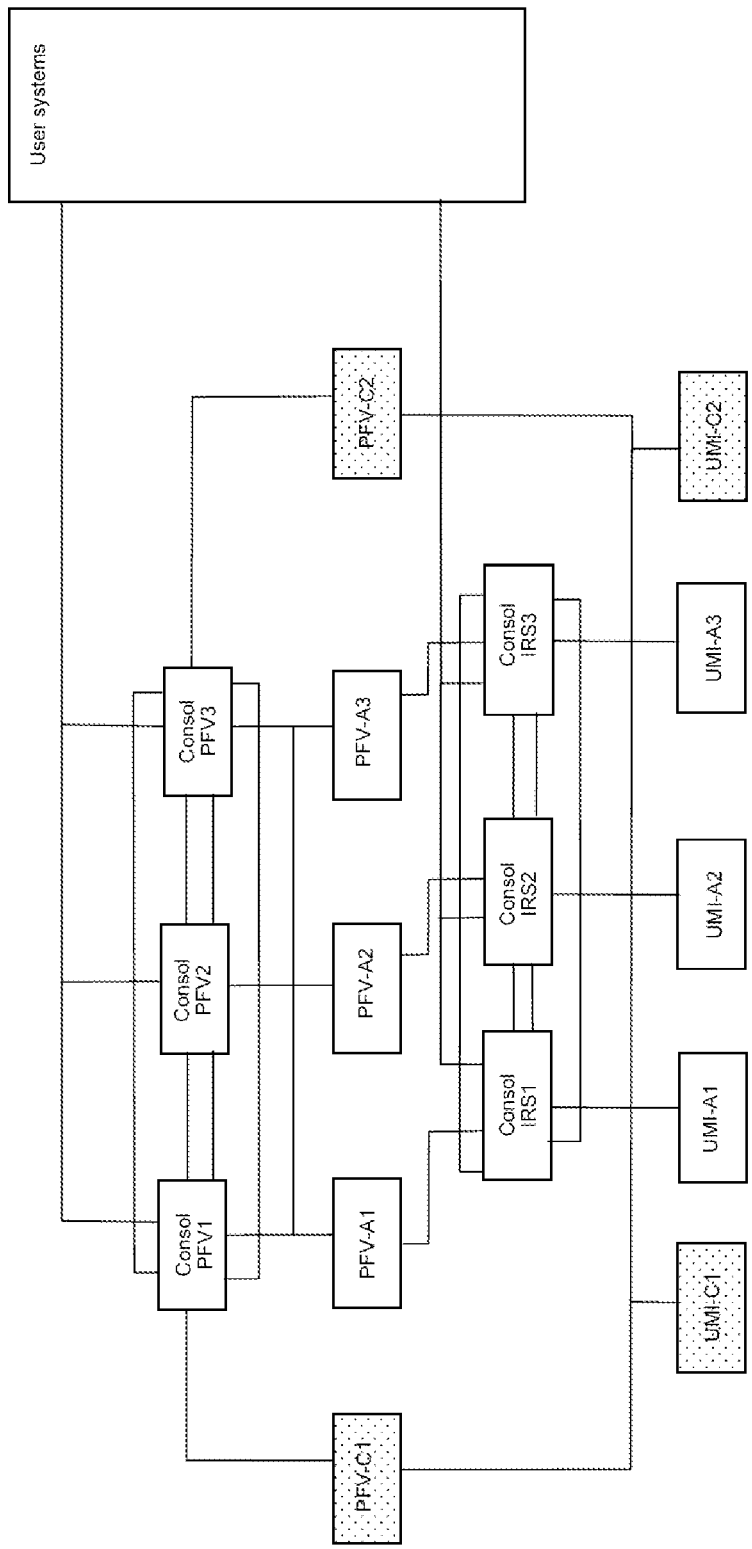
FIG. 5 represents a first variant of a logic architecture of the device according to the invention.

FIG. 5 presents a generic "inertial reference chain" architecture. In this figure, the logic components used are as follows:

UMI-A: logic component for supplying inertial measurements acquired by class A sensors. In accordance with what was explained in the section on navigation sensors, it is necessary to have at least three UMI-A logic components in the architecture.

UMI-C: logic component for supplying inertial measurements acquired by class C sensors. In accordance with what was explained in the section on navigation sensors it is necessary to have at least two UMI-C logic components in the architecture. These components are produced in different technologies from the class A components.

Consol IRS: component for the upstream consolidation of the inertial measurement information. The aim of this logic block is to detect anomalies on the inertial measurements performed by the cluster of sensor blocks of different classes (malfunction sensor, anomaly response detection of abnormal environment measurements). It is necessary to have at least three consol IRS logic components in the architecture.

PFV-A: logic component for computing inertial references by the integration of the inertial measurements acquired by the class A sensors.

PFV-C: logic component for computing inertial references by the integration of the inertial measurements acquired by the class C sensors.

Consol PFV: component for the downstream consolidation of the integrated inertial parameters. This block performs the anomaly detection on the computation of the inertial parameters computed on the basis of the consolidated inertial measurements (malfunction of the computation unit, software fault, undetected sensor malfunction upstream). It is necessary to have at least three Consol PFV logic components in the architecture.

This type of architecture for an inertial reference chain implements sensors with different performance levels and produced by dissimilar technologies.

According to the level of accuracy, of integrity, of continuity and of operational availability required for the supply of the inertial reference information, any other combination can be envisaged, both in terms of number and of type of sensors (for example, a combination of 2 type A chains+2 type C chains).

In the architecture variant proposed by FIG. 5, the inertial measurement means 121 are implemented by three logic components (UMI-A1, UMI-A2, UMI-A3) and two dissimilar logic components (UMI-C1, UMI-C2).

These components supply raw inertial measurements of accelerations and of angular speeds (INS-X RD: Raw Data). These data are consolidated by the suitable means 122, implemented by three consolidation components (Consol-IRS1, Consol-IRS2, Consol-IRS3). The consolidated measurements are available for the user systems.

The suitable means 123 for computing integrated inertial reference parameters are implemented by three logic components (PFV-A1, PFV-A2, PFV-A3) processing the data measured by the UMI-A components, and two logic components (PFV-C1, PFV-C2) processing the data measured by the UMI-C components. The data obtained from the PFV components are consolidated by the means 124, implemented by three consolidation logic components (Consol PFV1, Consol PFV2, Consol PFV3). These consolidated data are available for the user systems.

Figure 6:
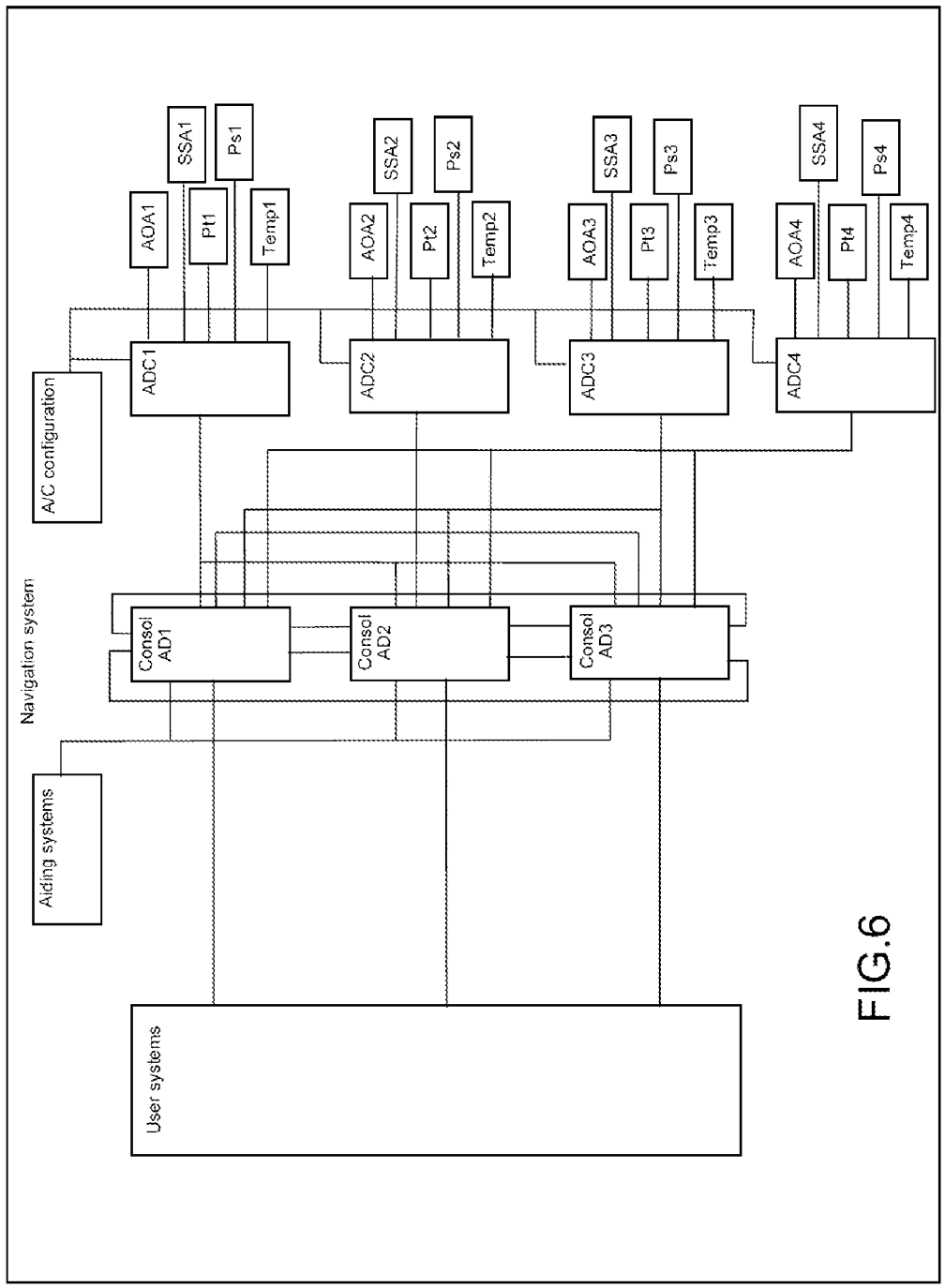
FIG. 6 represents a second variant of a logic architecture of the device according to the invention.
Figure 7:
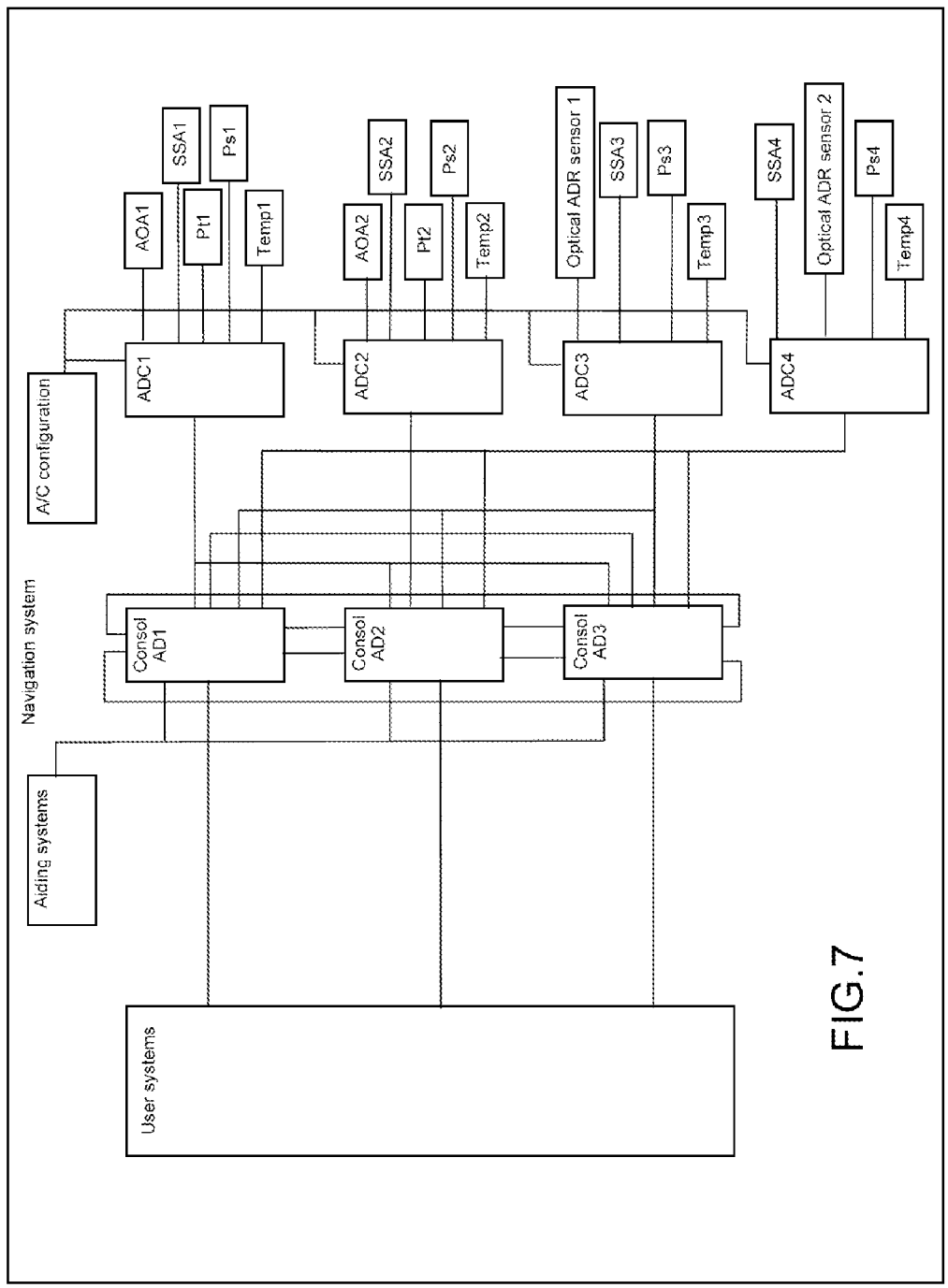
FIG. 7 represents a third variant of a logic architecture of the device according to the invention.

FIGS. 6 and 7 present generic "anemo-barometric reference chain" architectures.

The implementation logic components for determining anemo-barometric references are then as follows:

Pt: logic component for measuring the total pressure
Ps: logic component for measuring the static pressure
Temp: logic component for measuring the air temperature
AOA: logic component for measuring the air angle of attack
SSA: logic component for measuring the air side slip angle
ADC: logic component for computing the different anemo-barometric parameters (this component may include consolidation functions upstream of the sensor measurements).
Consol AD: logic component performing the upstream and downstream consolidation of the anemo-barometric information originating from the ADC components. It is necessary to have at least three consol AD blocks in the architecture.

The aim of this logic block is to detect anomalies on the air data measurements performed by the probes (sensor malfunction, anomaly response detection of abnormal environment measurements). This block also performs the detection of anomalies on the computation of the air data parameters computed by the ADC blocks.

Optical ADR sensor: logic component for measuring components of the airspeed vector by optical means of laser anemometry type (depending on the number of measurement axes, this component will supply one-, two- or three-dimensional data).

FIG. 6 presents a typical generic architecture with 4 chains without laser anemometer. Each chain comprises measurement means 131 implemented by logic components of Pti, Psi, AOAi, SSAi type. The consolidation means 132 and anemo-barometric computation means 133 are implemented by logic components ADCi. These components make use of the aeroplane configuration information (for example landing gear, nose and flap configurations) coming from external systems to manage corrections applied to the raw measurements obtained from the means 131. Some measurement and computation chains (chains 3 and 4 in the example of FIG. 6) will be implemented as far as possible through dissimilar technical solutions.

The data obtained from the ADC components are consolidated by the means 134, implemented by three consol ADi logic components. These devices mutually consolidate the data obtained from the multiple ADC components, and can also use data obtained from other systems (aiding systems) than the "air data" dedicated systems (for example pressure or air temperature measurements supplied by the aeroplane engine management system). The consolidated data are distributed to the user systems.

FIG. 7 presents a typical generic architecture with 4-channel laser anemometer, of which two measurement channels incorporate the "laser anemometry" technology.

It represents an exemplary implementation; depending on the performance level required (accuracy, integrity, continuity, availability), architectures with a different combination of sensors and greater or lesser redundancies for all or part of the measurements are possible.

Compared to the architecture of FIG. 5, this architecture comprises measurement means 131 implemented by logic components of Pti, Psi, AOAi, SSAi type, and also of Optical ADR sensor type. The Optical ADR sensor components can supply monodirectional, bidirectional or tridirectional measurements of the airspeed vector. The consolidation and computation means 132 and 133 will be implemented by different ADC components depending on whether or not they have to process laser anemometry measurements.

The physical architectures presented hereinbelow make it possible to implement the logic architectures described previously. They define a certain number of physical components of architectures which contain different identified logic components, and which make it possible to define the functions of these equipment items.

The physical equipment items of the architecture are interconnected through a communication network (high speed multiplexed digital bus) which makes it possible to exchange the information needed to perform the functions of these equipment items.

Each of the two physical architectures described hereinbelow comprises two radionavigation equipment items (RAD-NAV) combining all of the conventional radio means (VOR/DME/ILS/MLS/MKR), as well as VDB for the GBAS mode.

Figure 8:
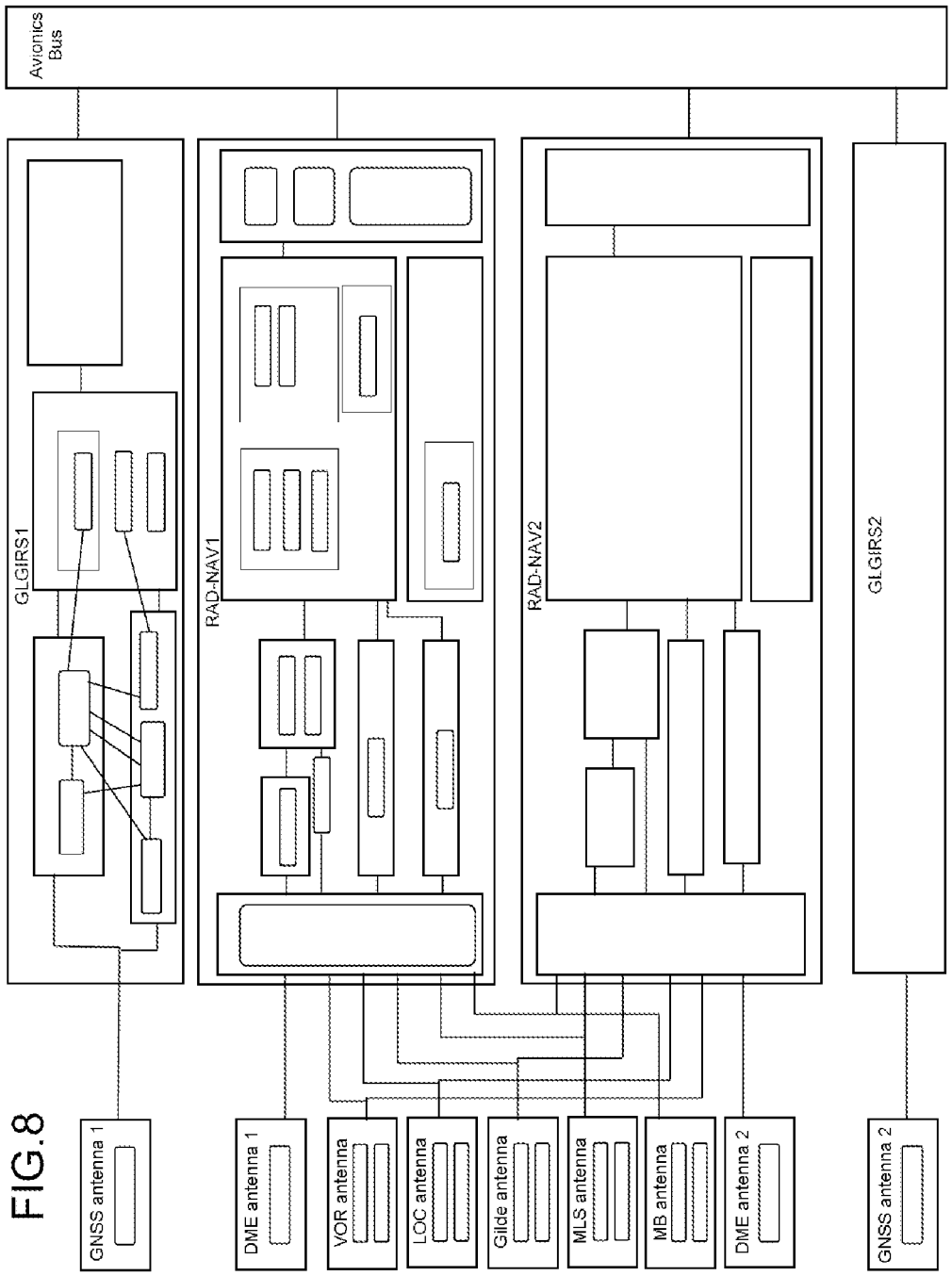
FIG. 8 represents a first variant of a hardware architecture of the device according to the invention.

FIG. 8 represents a first variant of a hardware architecture of the device according to the invention.

A first physical architecture variant is a physical implementation of the first (dual) logic architecture presented previously. The first physical architecture variant comprises: two radionavigation data receivers (GNSS) and two GLGIRS equipment items.

The GLGIRS equipment item comprises hardware and software means for implementing UMIA, MCR, Consol IRS, consol GNSS, consol POS3D logic components.

Figure 9:
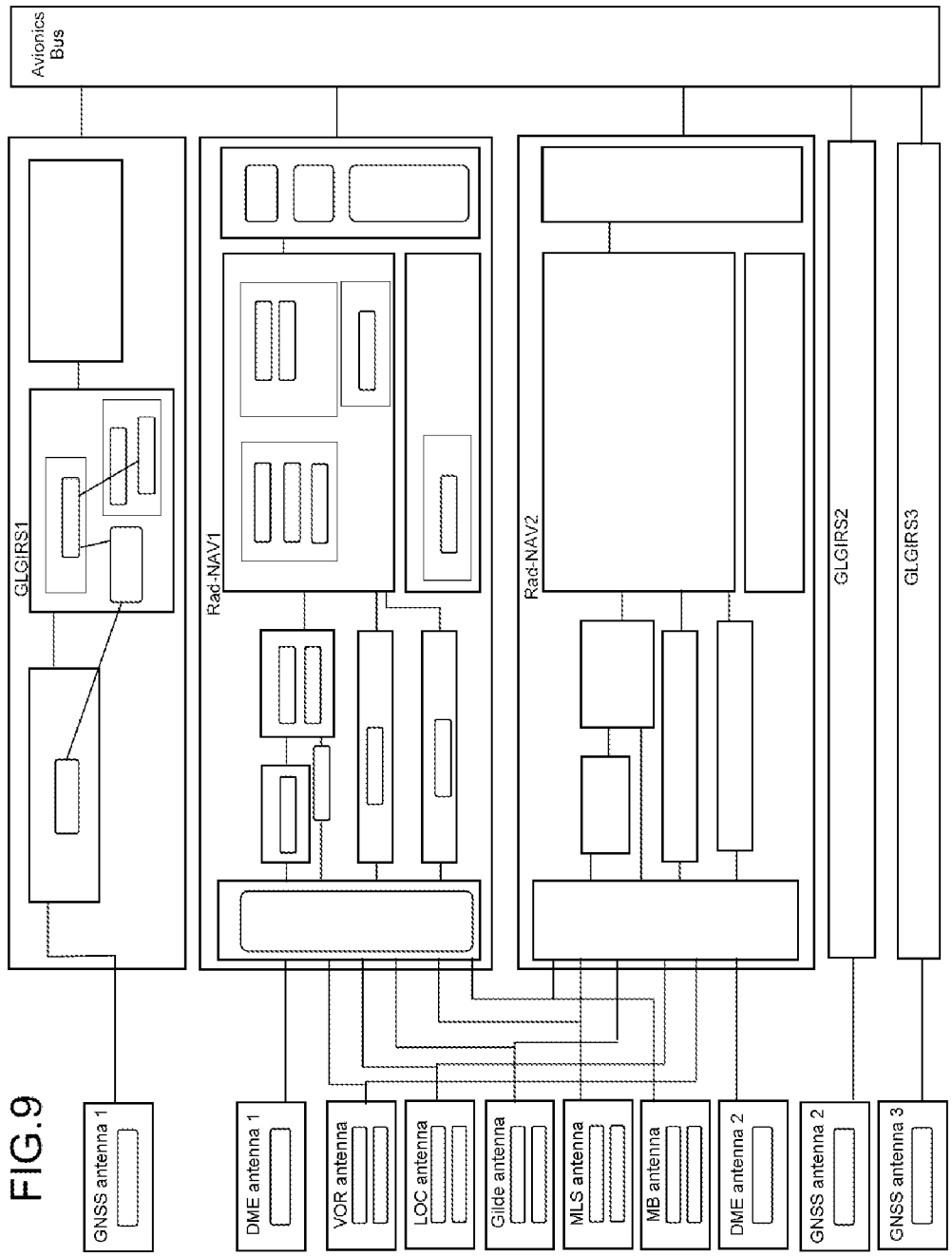
FIG. 9 represents a second variant of a hardware architecture of the device according to the invention.

FIG. 9 represents a second variant of a hardware architecture of the device according to the invention.

The second physical architecture variant is a physical implementation of the second (triplex) logic architecture presented previously. The second physical architecture variant comprises: three radionavigation data receivers (GNSS) and three GLGIRS equipment items.

Figure 10:
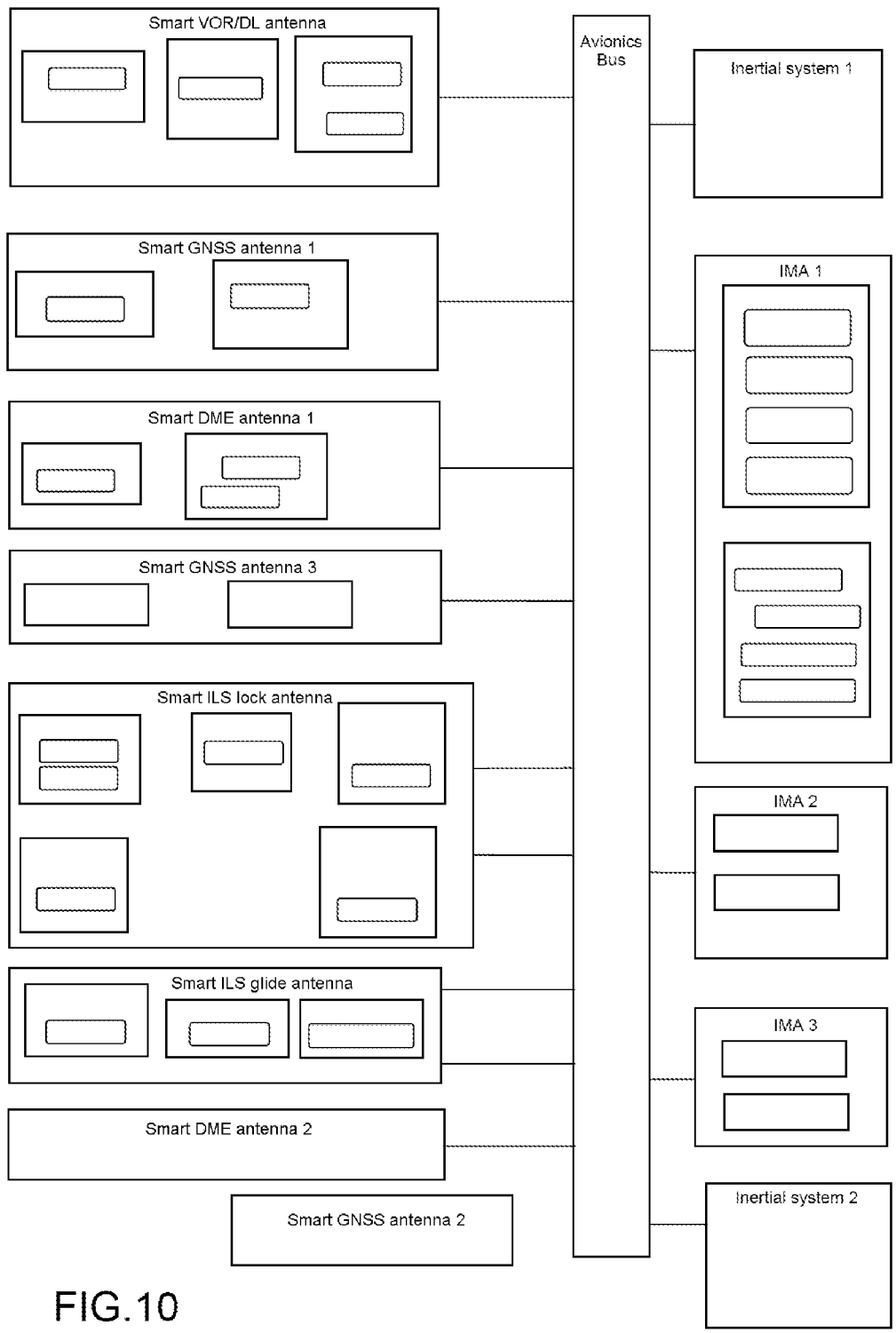
FIG. 10 represents a third variant of a hardware architecture of the device according to the invention.

FIG. 10 represents a third variant of a hardware architecture of the device according to the invention.

The third physical architecture variant, called smart antenna, is a physical implementation of the triplex logic architecture presented previously in which the device comprises 3 MCR and 3 GNSS antennas.

In this variant, the radio means, the antennas and the analogue and digital antenna-signal processing means are combined in components supplying data which can be processed by generic computers.

Two major guidelines are used to steer the construction of the physical architectures for the inertial reference chain:
  Group the various logic components (UMI=sensors, computation software component PFV and consolidation software components) in one and the same equipment item: this is the basis of the IRS concept, which can then evolve into ADIRS if the ADR function is incorporated therein, or GIRS if the GPS functions are incorporated, etc.
  Dissociate the UMI component and the PFV computation and consolidation components, transferred to an IMA-type generic computation resource or implemented by other computers.

Moreover, the introduction of dissimilarity for the computation logic components will be done through different software productions and/or implementations on different physical platforms.

The physical architecture variants proposed hereinbelow constitute generic examples. Any other arrangement combining the principles of the generic architectures is possible.

Figure 11:
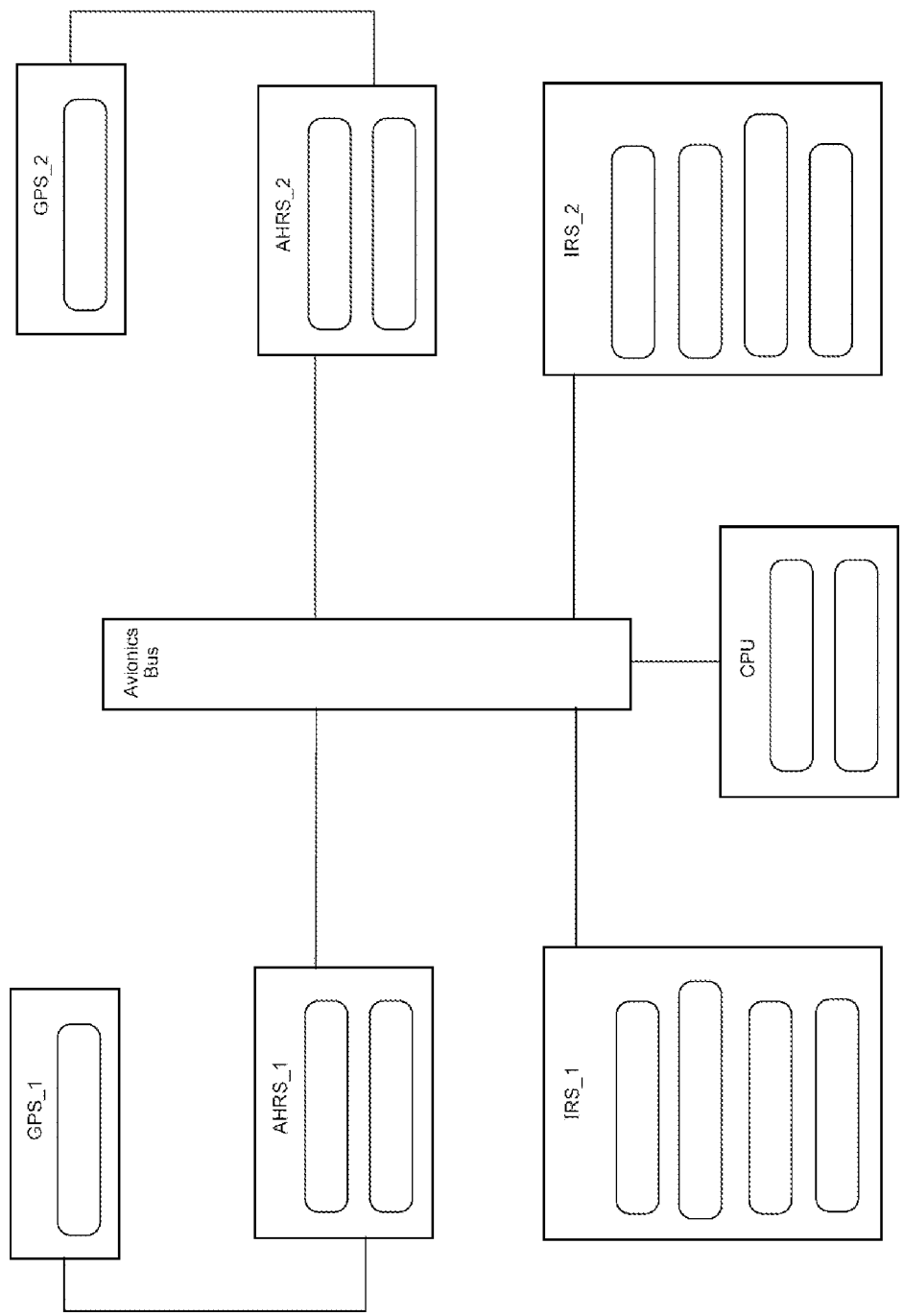
FIG. 11 represents a first variant of a hardware architecture, in which the components are implemented conventionally, of the device according to the invention.

FIG. 11 represents a first hardware architecture variant in which the various components are implemented conventionally in the form of equipment items of IRS (Inertial Reference System) and AHRS (Attitude and Heading Reference System) type depending on the performance class.

The AHRS equipment items use GPS data in order, on the one hand, to produce an inertia/GPS hybridization making it possible to obtain enhanced performance levels for the attitudes, on the other hand to define a true heading reference from two-antenna measurements. This heading reference is used for hybridization with the inertial measurements to generate a gyro-stabilized heading.

The AHRS equipment items deliver accelerations and angular speeds, as well as attitude, heading and vertical speed information, which are sent to the consolidation components implemented in the IRS components.

The exchanges between physical components are performed via fast and secure data buses (guaranteeing the required levels of integrity and continuity).

The consolidation components can be implemented in the IRS and/or the AHRS and/or on generic computation platforms (CPU).

Figure 12:
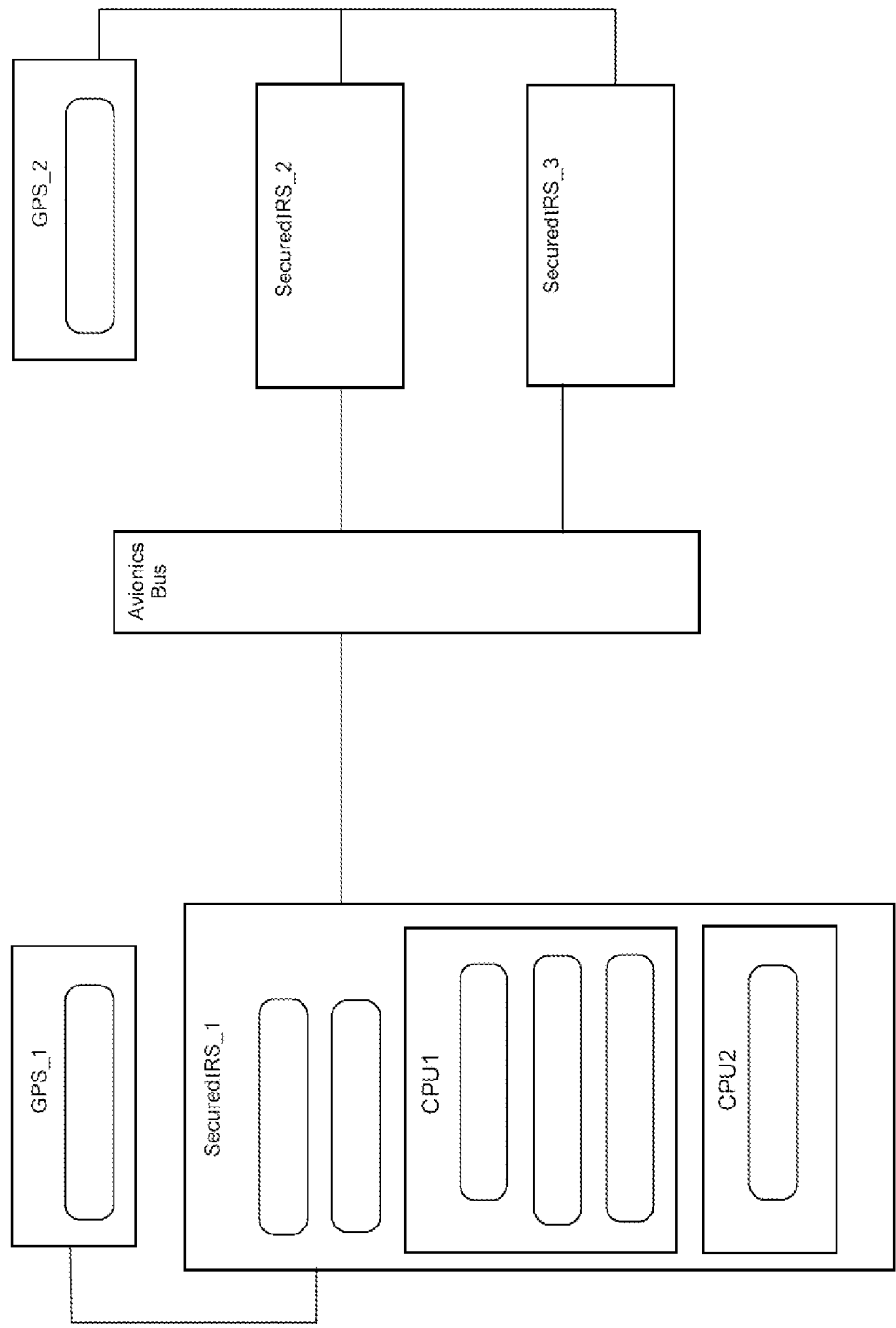
FIG. 12 represents a second variant of a hardware architecture, in which the components are implemented conventionally, of the device according to the invention.

The architecture variant presented in FIG. 12 comprises three equipment items called "Secured-IRS".

By incorporating in one and the same equipment item a class A channel and a dissimilar class C channel (GPS hybridized to enhance the attitude and heading performance levels), an inertial equipment item S-IRS (Secured-IRS) is obtained, supplying consolidated data with a catastrophic-level integrity at the output of a single equipment item.

The internal organization of the S-IRS product will have to be studied carefully to maintain a strong segregation between class A and C chains, in particular in the electrical power supplies, the communication interfaces and the partitioning of the software processing operations.

Figure 13:
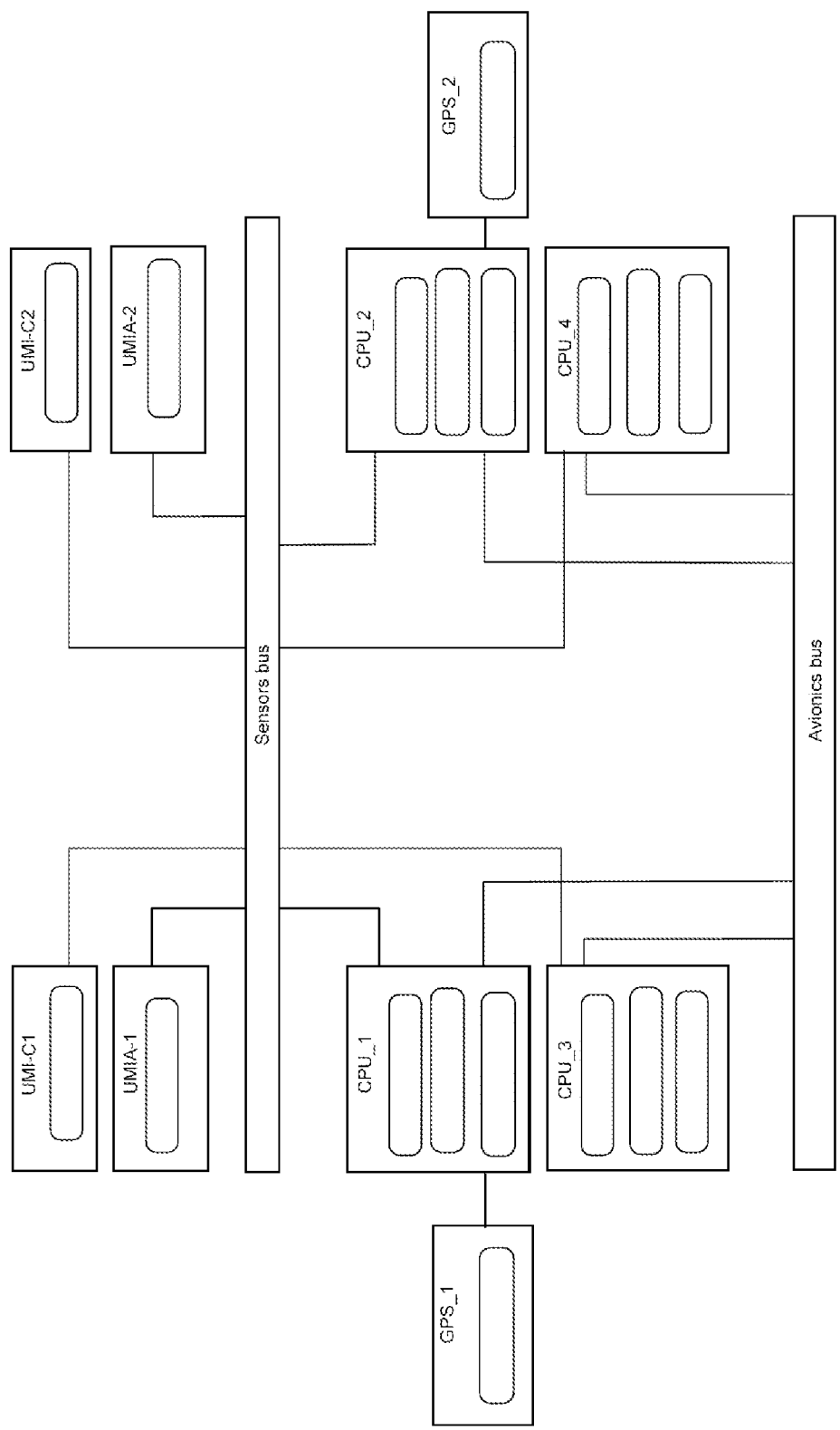
FIG. 13 represents a third variant of a hardware architecture, in which the components are implemented conventionally, of the device according to the invention.

Unlike the maximum grouping logic presented by the preceding architecture, the variant of FIG. 13 obeys a logic of separation of the UMI components (inertial sensors) and the computation components.

The aim of such an architecture is to obtain compact UMI units, that will be able to be easily installed in more favourable positions for the inertial measurements.

To avoid the risk of common modes, the PFV-A and PFV-C processing operations will have to be implemented on segregated and dissimilar computation platforms. On these CPU resources will be implemented the consolidation SW components (different algorithmic implementations also improving the resistance to the common modes and making it possible to reduce the development Design Assurance Level (DAL).

The high information bit rate at the output of the UMI components will be supported by a dedicated local bus, ensuring the communication between UMI sensor components and computation components on the generic CPUs.

The possibilities of physical implementations of the anemo-barometric chain are extremely varied. They are dictated by a few major guiding principles:
  organization of the grouping of various measurement functions to constitute multifunctional probes,
  placement of the computation resources implementing the computation and consolidation components.

Figure 14:
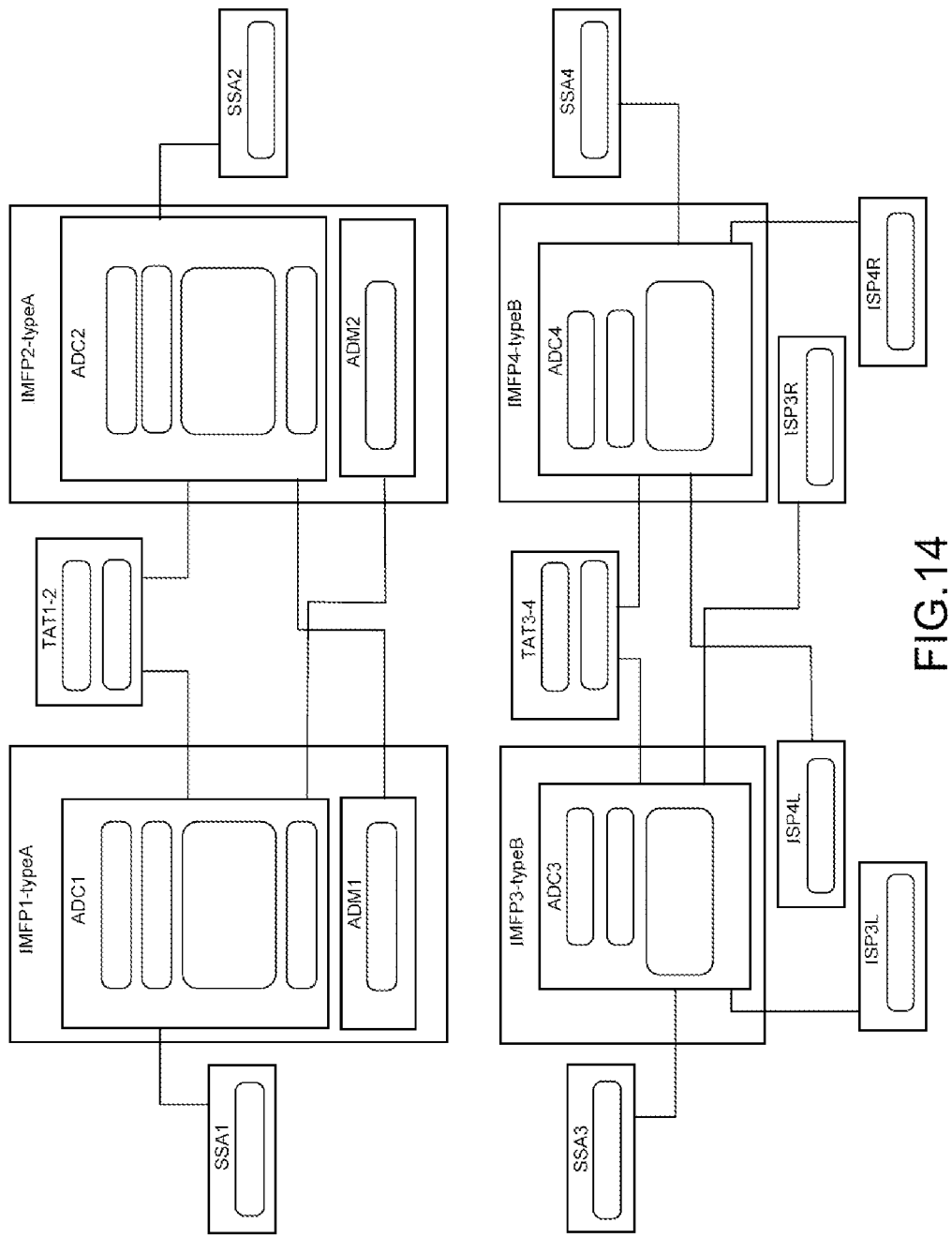
FIG. 14 represents a fourth variant of a hardware architecture, in which the components are implemented conventionally, of the device according to the invention.

FIG. 14 presents a first architecture variant which comprises two implementations of multifunction probes. The probes of type A (IMFP-A for Integrated Multi Functions Probe type A) combine the logic components of Pt, Ps, AOA and ADC type. They can be interfaced with external probes supplying temperature and side slip angle measurements (SSA component). Each probe incorporates two segregated Ps measurements, including one Ps measurement intended for the probe installed on the opposite side to compensate for a possible side slip effect on the pressure measurements. The probes of type B (IMFP-B for Integrated Multi Functions Probe type B) present an implementation variant, and combine the Pt, AOA and ADC logic components. The logic components of Ps type are implemented by integrated static probes (ISP). Two ISP probes are implanted on each side of the aeroplane in order to access a Ps measurement corrected of any side slip effect.

Figure 15:
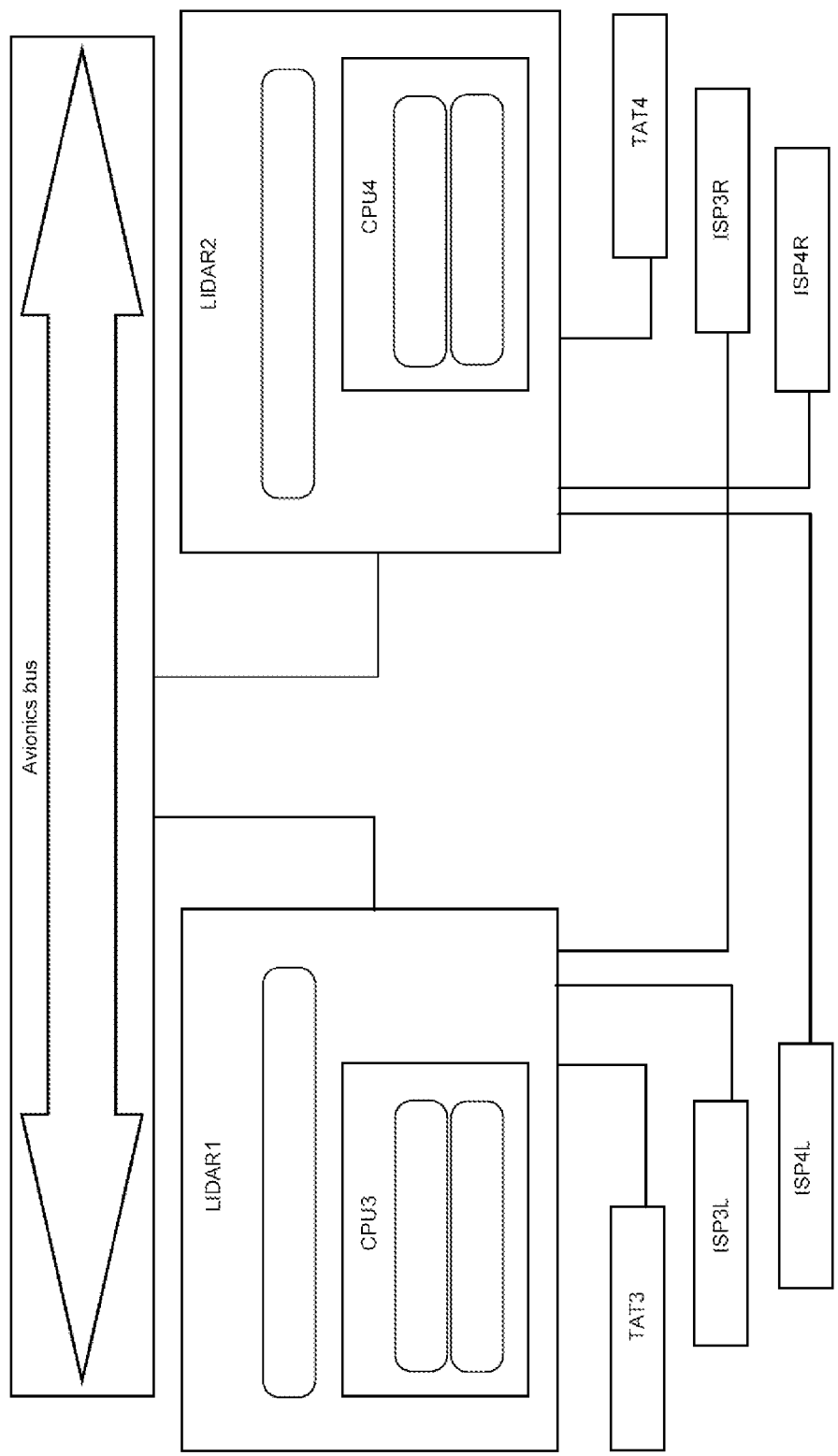
FIG. 15 represents a fifth variant of a hardware architecture, in which the components are implemented conventionally, of the device according to the invention.

A variant of the preceding architecture consists in replacing certain channels with an implementation based on laser anemometry. FIG. 15 represents a first variant of implementation of two measurement channels based on the laser anemometry technology. In this variant, the optical measurement means (Optical ADR sensor), air data computation means (ADC_SW) and air data consolidation means (Consol AD_SW) are integrated in one and the same component, called LIDAR in the figure. This component also carries out the acquisition of temperature and static pressure data supplied by external components (TATi and ISPi), data that are necessary to the computation of the air data.

Figure 16:
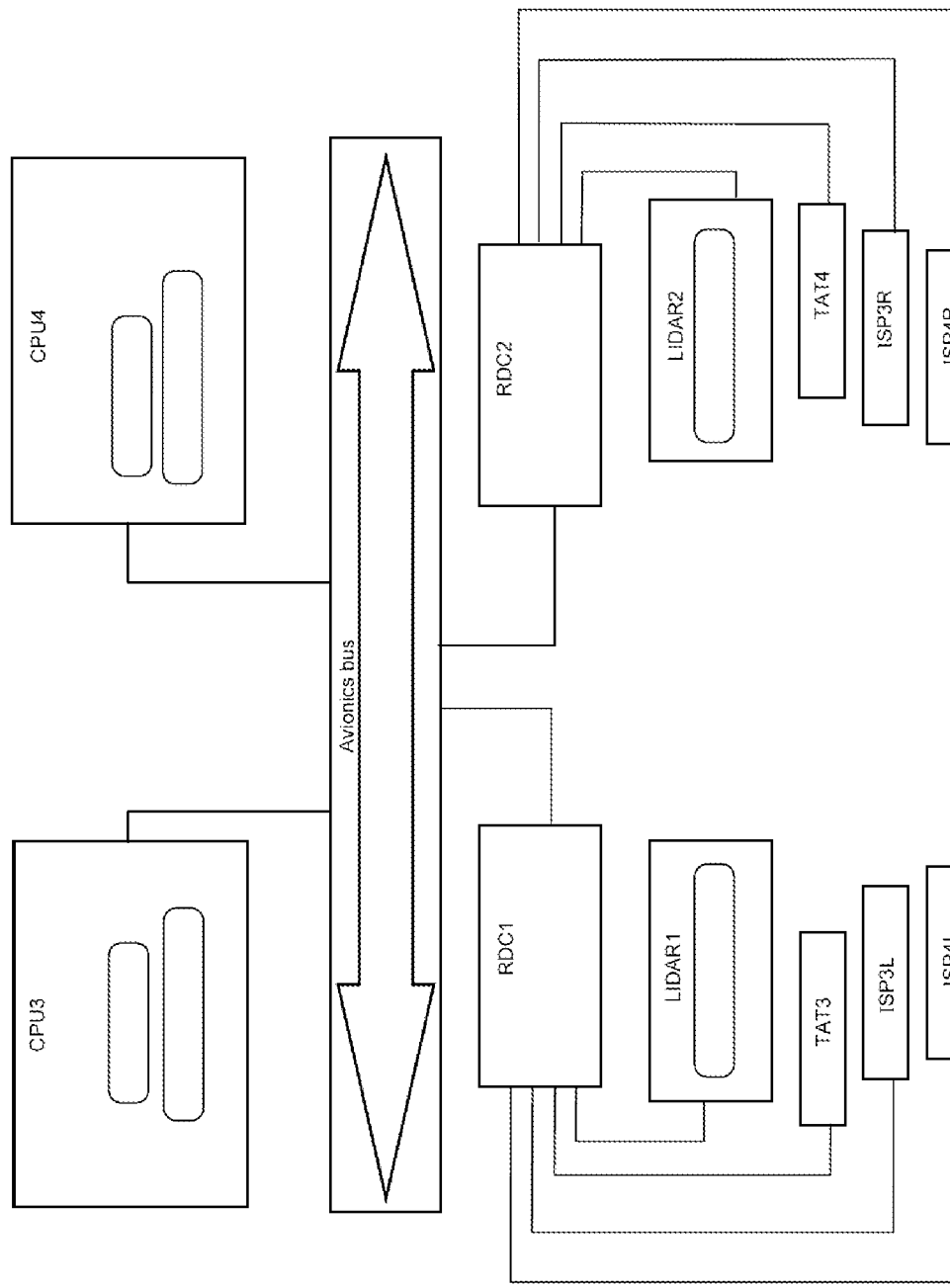
FIG. 16 represents a sixth variant of a hardware architecture, in which the components are implemented conventionally, of the device according to the invention.

FIG. 16 represents a second variant of implementation of the two measurement channels based on the laser anemometry technology. In this variant, the physical LIDAR component implements only the optical measurement means. The components dedicated to the air data computations and air data computation consolidation are implemented on generic computations of IMA (Integrated Modular Avionics) type. The temperature and static pressure data necessary to the computation of the air data are supplied by external components (TATi and ISPi). These data are collected by physical components of RDC (Remote Data Concentrator) type and transmitted to the computation components via fast and secure avionics data buses (Avionics backbone bus).

The invention claimed is:

1. A device for determining location information, inertial primary references and anemo-barometric data consolidated for an aircraft, comprising:
   a circuit for determining location information comprising;
      radionavigation sensors for measuring radionavigation data;
      radionavigation data consolidation means for consolidating the measured radionavigation data;
      position parameter computing means for computing aircraft position parameters from the consolidated radionavigation data;
      position parameter consolidation means for consolidating the computed position parameters;
   a circuit for determining inertial primary references comprising:
      inertial measurement sensors for measuring inertial data indicating the movement of the aircraft relative to a terrestrial coordinate system;
      inertial data consolidation means for consolidating the measured inertial data;
      inertial reference computing means for computing inertial reference parameters of the aircraft from the consolidated inertial data;
      inertial reference data consolidation means for consolidating the computed inertial reference parameters;
   a circuit for determining anemo-barometric data comprising:
      air data measurement sensors for measuring anemo-barometric data indicating the movement of the aircraft relative to the air;
      air data consolidation means for consolidating the measured anemo-barometric data;
      air data reference computing means for computing anemo-barometric reference parameters of the aircraft from the consolidated anemo-barometric data;
      air data parameter consolidation means for consolidating the computed anemo-barometric reference parameters;
   wherein the radionavigation data consolidation means, inertial data consolidation means and the air data consolidation means each comprise a plurality of consolidation circuits, each of the consolidation circuits being associated with an index and comprising:
      a computation means for each of said circuit for determining location information, said circuitry for determining inertial primary references, and said circuit for determining anemo-barometric data, respectively, each computation means being linked to all of said measurement sensors of the corresponding one of said circuits, each of the computation means comparing the measurements of said measurement sensors of the corresponding one of said circuits to thereby detect malfunctioning measurement sensors;
      an ordered storage means for storing the results of the computation of each of the computation means of the others of the plurality of consolidation circuits ranking the results in ascending order of the indices associated with the consolidation circuits, from i+1 to n, and from 1 to i−1, and eliminating the results of the computations of the consolidation circuits for which the measurement sensors are malfunctioning;
      a first comparison means in each of the consolidation circuits, performing a comparison between the result of each computation means and the first result of the ordered storage means storing the computation results of the other computation means in the respective consolidation circuit to thereby detect a malfunctioning computation means;
      an ordered storage means for storing the results of each of the first comparison means ordering the results of each of the first comparison means in descending order of the indices associated with the consolidation circuits from i−1 to 1, and from n to i+1, and eliminating the results of the first comparison means of the consolidation circuits for which the computation means are malfunctioning; and
      a second comparison means in each of the consolidation circuits to compare the results of each of the first comparison means in one consolidation circuit with the result of one of the first comparison means others of the consolidation circuits to thereby detect malfunctioning first comparison means to shutdown the consolidation circuit for which the first comparison means are malfunctioning;
   means for hybridizing the inertial data and the radionavigation data; and
   means for hybridizing the inertial data and the anemo-barometric data.

2. The device according to claim 1, in which:
   the radionavigation sensors comprise two first logic component sub-means for providing Global Navigation Satellite System (GNSS) measurements and two different logic component sub-means, each of the first and second logic component sub-means being linked to two different antennas supplying synchronous measurements on the radionavigation data;
   the radionavigation data consolidation means for consolidating the measured radionavigation data comprise four radionavigation signal consolidation sub-means making it possible to consolidate the measurements on the radionavigation data;
   the position parameter computing means for computing aircraft position parameters comprise two measurement prediction sub-means, the radionavigation consolidation means for consolidating the computed position parameters comprise the same two measurement prediction sub-means, making it possible to compute positions of the aircraft from consolidated inertial data measurements and consolidated radionavigation data measurements;
   said device also comprises:
   two pilot selectable approach sub-means making it possible to activate, for a given approach, an approach means selected by the pilot, and making it possible to compute deviations relative to a predetermined reference approach trajectory; and
   two approach deviation consolidation sub-means making it possible to consolidate the computations of the deviations.

3. The device according to claim 1, in which:
   the means for measuring radionavigation data comprise three first logic component sub-means each linked to one antenna from a set of three antennas supplying synchronous measurements on radionavigation data, the suitable means for consolidating the measured radionavigation data comprise three radionavigation signal consolidation sub-means for consolidating the measurements on the radionavigation data;

the suitable means for computing aircraft position parameters comprise two measurement prediction sub-means, the suitable means for consolidating the computed position parameters comprise the same two measurement prediction sub-means, for computing positions of the aircraft from consolidated inertial data measurements and consolidated radionavigation data measurements;

said device also comprises:

three pilot consolidated approach sub-means for activating, for a given approach, an approach means selected by the pilot, for computing and consolidating deviations relative to a predetermined reference approach trajectory.

4. The device according to claim 1, comprising a radionavigation equipment item making it possible to at least one of transmit and receive radio waves observing all the standards used in the radionavigation applications.

5. The device according to claim 1, comprising two means for detecting movements and accelerations, a dual satellite location receiver, and means for determining the location from the signals received from said dual receiver.

6. The device according to claim 1, comprising three means for detecting movements and accelerations, a dual satellite location receiver and means for determining the location from the signals received from said dual receiver.

7. The device according to claim 1, comprising at least one first receiver comprising an antenna and analogue and digital processing means for processing the signals originating from the antenna.

8. The device according to claim 7, in which the first receiver is chosen from:

a second location signal receiver using the VOR standard comprising a sub-means for receiving a signal in the VHF frequency band, a sub-means for sampling said signal received in the VHF frequency band and a sub-module for determining a distance between a VOR beacon and said signal receiver from said sampled signal;

a third receiver of satellite location signals comprising sub-means each linked to three antennas supplying synchronous measurements on radionavigation data;

a fourth receiver of distance signals using the DME standard comprising a sub-device supplying distances according to the DME standard;

a first landing assistant device using the ILS standard comprising a digital processing circuit for processing the signals received in the VHF and UHF bands and supplying location deviations; and a second landing assistant device using the ILS standard comprising a digital processing circuit for processing the signals received in the VHF and UHF bands and supplying deviations relative to a landing gradient.

9. The device according to claim 1, in which:

the inertial measurement sensors comprise at least two logic components for providing inertial measurements and at least two different logic components for providing inertial measurements supplying raw inertial measurements of accelerations and of angular speeds;

the inertial data consolidation means for consolidating the measured inertial data comprise at least three inertial signal consolidation sub-means for consolidating said raw inertial measurements of accelerations and of angular speeds;

the inertial reference computing means for computing inertial reference parameters comprise at least two logic components for computing inertial references processing said data measured by the at least two logic components for providing inertial measurements and at least two different logic components for providing inertial measurements processing said data measured by the at least two different logic components for providing inertial measurements; and the inertial data consolidation means for consolidating the computed inertial reference parameters comprise at least three sub-means for consolidating said data originating from the at least two logic components for computing inertial references and from the at least two different logic components for providing inertial measurements.

10. The device according to claim 1, in which:

the air data measurement sensors comprise sub-means for measuring at least one of total pressure, static pressure, air angle of attack, air side slip angle, and airspeed;

the air data consolidation means for consolidating the measured anemo-barometric data comprise air data signal consolidation means sub-means making it possible to consolidate the anemo-barometric parameters;

the anemo-barometric data consolidation means for computing anemo-barometric reference parameters of the aircraft from the consolidated anemo-barometric data comprise a logic component for computing anemo-barometric references for computing the anemo-barometric parameters; and the suitable means for consolidating the computed anemo-barometric reference parameters comprise three anemo-barometric references consolidation sub-means consolidating the data obtained from said air data signal consolidation means and the logic component for computing anemo-barometric references and are also suitable for using data originating from other systems.

11. A method for determining location information, inertial primary references and anemo-barometric data consolidated for an aircraft, the method comprising three parallel circuits for computing data:

a circuit for determining location information having successive steps of:
measuring radionavigation data;
consolidating the measured radionavigation data;
computing aircraft position parameters from the consolidated radionavigation data;
consolidating the computed position parameters;

a chain for determining inertial primary references having successive steps of:
measuring inertial data indicating the movement of the aircraft relative to a terrestrial coordinate system;
consolidating the measured inertial data;
computing inertial reference parameters of the aircraft from the consolidated inertial data;
consolidating the computed inertial reference parameters;

a circuit for determining anemo-barometric data comprising having successive steps of:
measuring anemo-barometric data indicating the movement of the aircraft relative to the air;
consolidating the measured anemo-barometric data;
computing anemo-barometric reference parameters of the aircraft from the consolidated anemo-barometric data;

consolidating the computed anemo-barometric reference parameters;
a step of hybridizing the inertial reference parameters and the aircraft position parameters, and
a step of hybridizing the inertial reference parameters and the anemo-barometric reference parameters, in addition, the steps of consolidating the measured radionavigation data, consolidating the measured inertial data, and consolidating the measured anemo-barometric data each comprise a plurality of consolidation circuits, each of the consolidation circuits being associated with an index and performing the successive steps of:

computing the measurements of the determination circuit to which the data belong, by comparing the measurements and making it possible to detect malfunctioning measurement means;

storing in order the results of the computations of the other consolidation circuits of a same consolidation step, ranking the results in ascending order of the indices associated with the consolidation circuits, from i+1 to n, and from 1 to i−1, and eliminating the results of the consolidation circuits for which malfunctions are measured;

performing a comparison between the result of the computation and the first stored result, making it possible to detect malfunctioning computations;

storing in order the results of the comparisons of the other consolidation circuits of a same consolidation step, ordering the results in descending order of the indices associated with the consolidation circuits, from i−1 to 1, and from n to i+1, and eliminating the results of the consolidation circuits for which the malfunctioning computations are detected; and comparing the result of the comparison with the result of the comparison of one of the other consolidation circuits of a same consolidation step, making it possible to detect malfunctioning comparison means and making it possible to shutdown the consolidation circuits for which the comparison is malfunctioning.

* * * * *